US009296472B2

(12) United States Patent
Thoreen et al.

(10) Patent No.: US 9,296,472 B2
(45) Date of Patent: Mar. 29, 2016

(54) WINGTIP CONTROL SYSTEM

(71) Applicant: The Boeing Company, Chicago, IL (US)

(72) Inventors: Adam Marshall Thoreen, Lake Stevens, WA (US); Joshua Jay Baer, Shoreline, WA (US); Joseph Adam Sikora, Seattle, WA (US); Matthew August Lassen, Seattle, WA (US); Michael Edwin Foster, Bellingham, WA (US); Timothy P. Gallagher, Granite Falls, WA (US)

(73) Assignee: THE BOEING COMPANY, Chicago, IL (US)

( * ) Notice: Subject to any disclaimer, the term of this patent is extended or adjusted under 35 U.S.C. 154(b) by 182 days.

(21) Appl. No.: 14/056,475

(22) Filed: Oct. 17, 2013

(65) Prior Publication Data

US 2015/0108283 A1    Apr. 23, 2015

(51) Int. Cl.
 *B64C 13/04*    (2006.01)
 *B64C 3/56*    (2006.01)
 *B64D 45/00*    (2006.01)
 *B64C 23/06*    (2006.01)

(52) U.S. Cl.
 CPC . *B64C 13/04* (2013.01); *B64C 3/56* (2013.01); *B64C 23/065* (2013.01); *B64D 45/0005* (2013.01)

(58) Field of Classification Search
 CPC .................................. B64C 13/00; B64C 13/04
 USPC ........................................................ 244/234
 See application file for complete search history.

(56) References Cited

U.S. PATENT DOCUMENTS 5,381,986 A * 1/1995 Smith et al. ...................... 244/49

OTHER PUBLICATIONS

Sakurai et al., "Swing Tip Assembly Rotation Joint," U.S. Appl. No. 13/530,089, filed Jun. 21, 2012, 51 pages.
Kordel et al., "Latching Apparatus and Methods," U.S. Appl. No. 13/493,688, filed Jun. 11, 2012, 38 pages.
Dees et al., "Hinged Raked Wing Tip," U.S. Appl. No. 13/664,416, filed Oct. 30, 2012, 23 pages.
Good et al., "Wing Hinge Assembly Including Hinged Torque Boxes," U.S. Appl. No. 13/664,371, filed Oct. 30, 2012, 20 pages.
Good et al., "Wing Fold System with Latch Pins Through Multiple Mating Lugs," U.S. Appl. No. 14/049,425, filed Oct. 9, 2013, 80 pages.
Lassen et al., "Wing Fold Controller," U.S. Appl. No. 14/022,622, filed Sep. 10, 2013, 61 pages.
Extended European Search Report, dated Feb. 20, 2015, regarding Application No. EP14187334.9, 7 pages.
Canadian Intellectual Property Office Examination Search Report, dated Dec. 22, 2015, regarding Application No. 2,859,805, 3 pages.

* cited by examiner

*Primary Examiner* — Justin Benedik
(74) *Attorney, Agent, or Firm* — Yee & Associates, P.C.

(57) ABSTRACT

A method and apparatus for a wingtip control system. The wingtip control system comprises a switch system for a flight deck of an aircraft and a controller. The switch system is configured to be placed into an armed state and generate an armed signal. The controller is in communication with the switch system. The controller is configured to receive the armed signal from the switch system, visually indicate a desired position for a wingtip of the aircraft in the switch system in response to an event occurring during operation of the aircraft, and generate a movement command to move the wingtip.

20 Claims, 19 Drawing Sheets

WINGTIP CONTROL SYSTEM

BACKGROUND INFORMATION

1. Field

The present disclosure relates generally to aircraft and, in particular, to control systems in aircraft. Still more particularly, the present disclosure relates to a method and apparatus for a wingtip control system.

2. Background

In designing and operating aircraft, it is desirable to provide aircraft configurations that yield reduced fuel burn by making components within the aircraft more aerodynamic. In particular, aircraft configurations with increased fuel efficiency are ever more important as fuel costs continue to increase. Designing more fuel efficient aircraft configurations may be achieved by using airfoil structures to reduce drag during various phases of flight.

In this illustrative example, an "airfoil structure" is a structure configured to produce an aerodynamic force on an aircraft when the aircraft moves. Examples of airfoil structures for aircraft include wingtips, wings, stabilizers, airbrakes, control surfaces, rudders, flaps, spoilers, ailerons, slats, and other suitable structures.

These airfoil structures may be attached to the aircraft and, in some cases, activated by a control system to move as desired. In other cases, these airfoil structures may be stationary structures that do not move relative to other components in the aircraft.

The control and operation of moveable airfoil structures in aircraft provide various design and operation challenges for pilots and aircraft manufacturers. For example, aircraft aerodynamic drag and fuel burn are generally reduced as the wingspan of the aircraft increases. Often, however, taxiway spacing, the distance between buildings, and gate locations for airports may not provide adequate spacing for aircraft with longer wingspans.

Some attempts have been made to improve aircraft wing efficiency without adding a fixed and permanent amount of wingspan. For example, moveable airfoil structures have been used. In particular, moveable wingtips can be used to extend wingspan during takeoff and flight to improve aircraft fuel efficiency. These moveable wingtips can then be configured for reduced wingspan for operation on the ground to improve ground obstacle clearance.

These moveable wingtips may be referred to as folding wingtips configured to fold and extend in response to a command from a control system. In this illustrative example, the terms fold and extend are used for the movements to reduce and increase wingspan, respectively.

The movement to configure the wingtips for reduced wingspan may involve a system that folds the wingtips to a vertical position, a system that folds the wingtips horizontally in a forward or rearward direction, or a system that retracts the wingtips into the fixed portion of the wings.

Control systems for moveable airfoil structures may be operated by flight crew to move the airfoil structures from a deployed position to an undeployed position during various phases of flight and/or during ground operation. In some cases, however, the control systems for moving airfoil structures may be more cumbersome than desired and may involve more flight crew intervention than desired. For instance, when operating a wingtip, the flight crew may have to physically move a control on the flight deck from one position to another position at a specified point in time. In some cases, however, the operational requirements for the flight crew to make a control input to move the wingtips may occur at a phase of flight where workload and distractions may prevent the flight crew from reliably and effectively operating the system as desired.

Further, the control for the wingtip may not be as intuitive to operate as desired. Therefore, it would be desirable to have a method and apparatus that take into account at least some of the issues discussed above, as well as other possible issues.

SUMMARY

In one illustrative embodiment, a wingtip control system comprises a switch system for a flight deck of an aircraft and a controller. The switch system is configured to be placed into an armed state and generate an armed signal. The controller is in communication with the switch system. The controller is configured to receive the armed signal from the switch system, visually indicate a desired position for a wingtip of the aircraft in the switch system in response to an event occurring during operation of the aircraft, and generate a movement command to move the wingtip.

In another illustrative embodiment, an apparatus comprises a flight deck interface for an aircraft and a controller in communication with the flight deck interface. The flight deck interface is configured to be placed into an armed state. The controller is configured to receive a signal indicating that a change in a position of an airfoil structure is desired. The controller is further configured to visually indicate the change in the position of the airfoil structure in the flight deck interface; generate a movement command in response to an event occurring during operation of the aircraft. The controller is still further configured to send the movement command to an airfoil structure between a deployed position and an undeployed position.

In yet another illustrative embodiment, a method for controlling a wingtip of an aircraft is presented. A signal is received from a flight deck interface indicating that a change in a position of the wingtip is desired. A desired position for the wingtip of the aircraft is visually indicated in the flight deck interface in the switch system in response to an event occurring during the operation of the aircraft. A movement command is generated to move the wingtip to the desired position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to have a control system for a wingtip that can be activated prior to takeoff or landing and automatically move the wingtip to a desired position at a later time. The illustrative embodiments recognize and take into account that it may be desirable to move the wingtip to the desired position automatically, without additional actions performed by the pilot that may take more attention from the pilot during takeoff and landing than desired.

The illustrative embodiments further recognize and take into account that it may be desirable to have a control system for the aircraft which works both manually and automatically. In other words, the illustrative embodiments recognize and take into account that a manual override feature may be needed to allow safe and efficient operation of wingtips for the aircraft.

The illustrative embodiments further recognize and take into account that it may be desirable for the control system to visually represent a desired position for the wingtip prior to movement of the wingtip. Additionally, it may be desirable for the control system to provide a visual indication of the desired position of the wingtip without reducing the field of view of the pilot during flight. For example, the illustrative embodiments recognize and take into account that control systems for wingtips that are located on a glareshield or other surface of the flight deck may reduce the view of the pilot more than desired when moved into an activated position. The illustrative embodiments also recognize and take into account that it may be desirable to have a control system that has a number of controls that are more intuitive for use by the flight crew than may be the case with currently available control systems.

Thus, the illustrative embodiments provide a method and apparatus for controlling a wingtip. A wingtip control system comprises a switch system for a flight deck of an aircraft and a controller. The switch system is configured to be placed into an armed state and generate an armed signal. The controller is in communication with the switch system. The controller is configured to receive the armed signal from the switch system, visually indicate a desired position for a wingtip of the aircraft in the switch system in response to an event during operation of the aircraft, and generate a movement command to move the wingtip.

Figure 1:
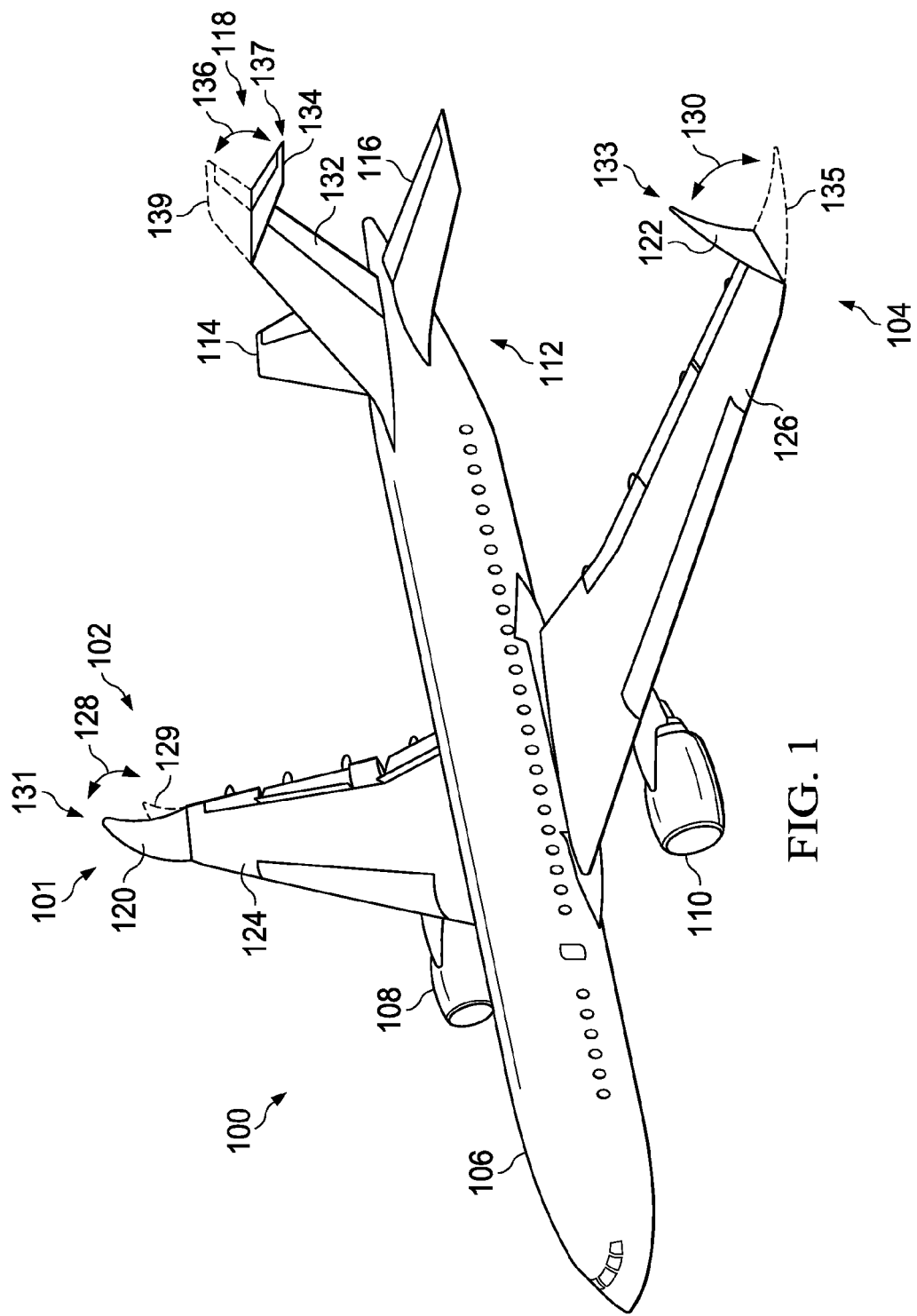
FIG. 1 is an illustration of an aircraft in accordance with an illustrative embodiment.

Referring now to the figures and, in particular, with reference to FIG. 1, an illustration of an aircraft is depicted in accordance with an illustrative embodiment. In this illustrative example, aircraft 100 has number of airfoil structures 101.

As used herein, a "number of" items may be one or more items. For example, a number of airfoil structures means one or more airfoil structures.

In this illustrative example, number of airfoil structures 101 may include various types of airfoil structures. For example, without limitation, airfoil structures in number of airfoil structures 101 may be selected from at least one of a wingtip, a wing, a horizontal stabilizer, a vertical stabilizer, an airbrake, a control surface, a rudder, a flap, a spoiler, an aileron, and a slat.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As illustrated, number of airfoil structures 101 includes wing 102, wing 104, horizontal stabilizer 114, horizontal stabilizer 116, vertical stabilizer 118, and other airfoil surfaces. One or more of number of airfoil structures 101 may be configured to move between a deployed position and an undeployed position in this illustrative example.

In this illustrative example, wing 102 and wing 104 are attached to body 106. Engine 108 is attached to wing 102 and engine 110 is attached to wing 104. Body 106 has tail section 112. Horizontal stabilizer 114, horizontal stabilizer 116, and vertical stabilizer 118 are attached to body 106.

In this depicted example, wing 102 includes fixed portion 124 and moveable portion 120. Fixed portion 124 may be an inboard portion of wing 102 that may be attached to body 106, while moveable portion 120 may be operable to move relative to fixed portion 124.

In a similar fashion, wing 104 includes fixed portion 126 and moveable portion 122 in this illustrative example. Fixed portion 126 is an inboard portion of wing 104 that may be attached to body 106, while moveable portion 122 may be operable to move relative to fixed portion 126.

In this depicted example, moveable portion 120 and moveable portion 122 may be referred to as moveable or foldable wingtips of wing 102 and wing 104, respectively. A "foldable wingtip," as used herein, is a wingtip configured to move relative to a fixed portion of the wing. These foldable wingtips may have different sizes, angles, movement patterns, and other parameters, depending on the particular implementation.

As illustrated, moveable portion 120 of wing 102 and moveable portion 122 of wing 104 are shown in a folded position. Moveable portion 120 of wing 102 may move in the direction of arrow 128 between unfolded position 129 and folded position 131 during different phases of operation of aircraft 100.

Moveable portion 122 of wing 104 may move in the direction of arrow 130 between a folded position 133 and unfolded position 135 in this illustrative example. In other illustrative examples, moveable portion 120 and moveable portion 122 may move in a different manner, depending on the functionality involved.

In this depicted example, vertical stabilizer 118 has fixed portion 132 and moveable portion 134. Fixed portion 132 is attached to body 106, while moveable portion 134 may move relative to fixed portion 132 in the direction of arrow 136. In this illustrative example, moveable portion 134 of vertical stabilizer 118 is operable to move between folded position 137 and unfolded position 139.

Aircraft 100 is an example of an aircraft in which a wingtip control system may be implemented in accordance with an illustrative embodiment. In this illustrative example, a wingtip control system may be a system configured to move a wingtip from a deployed position to an undeployed position and vice versa. As an example, the wingtip control system may move moveable portion 120 of wing 102 from a folded position to an unfolded position. The folded position is an undeployed position, and the unfolded position is a deployed position in this illustrative example. In this instance, the wingtip control system may be referred to as a wing fold control system.

The illustration of aircraft 100 in FIG. 1 is not meant to imply physical or architectural limitations to the manner in which an illustrative configuration may be implemented. For example, although aircraft 100 is shown as a commercial aircraft, aircraft 100 also may be a military aircraft, a rotorcraft, a helicopter, an unmanned aerial vehicle, or any other suitable aircraft.

Figure 2:
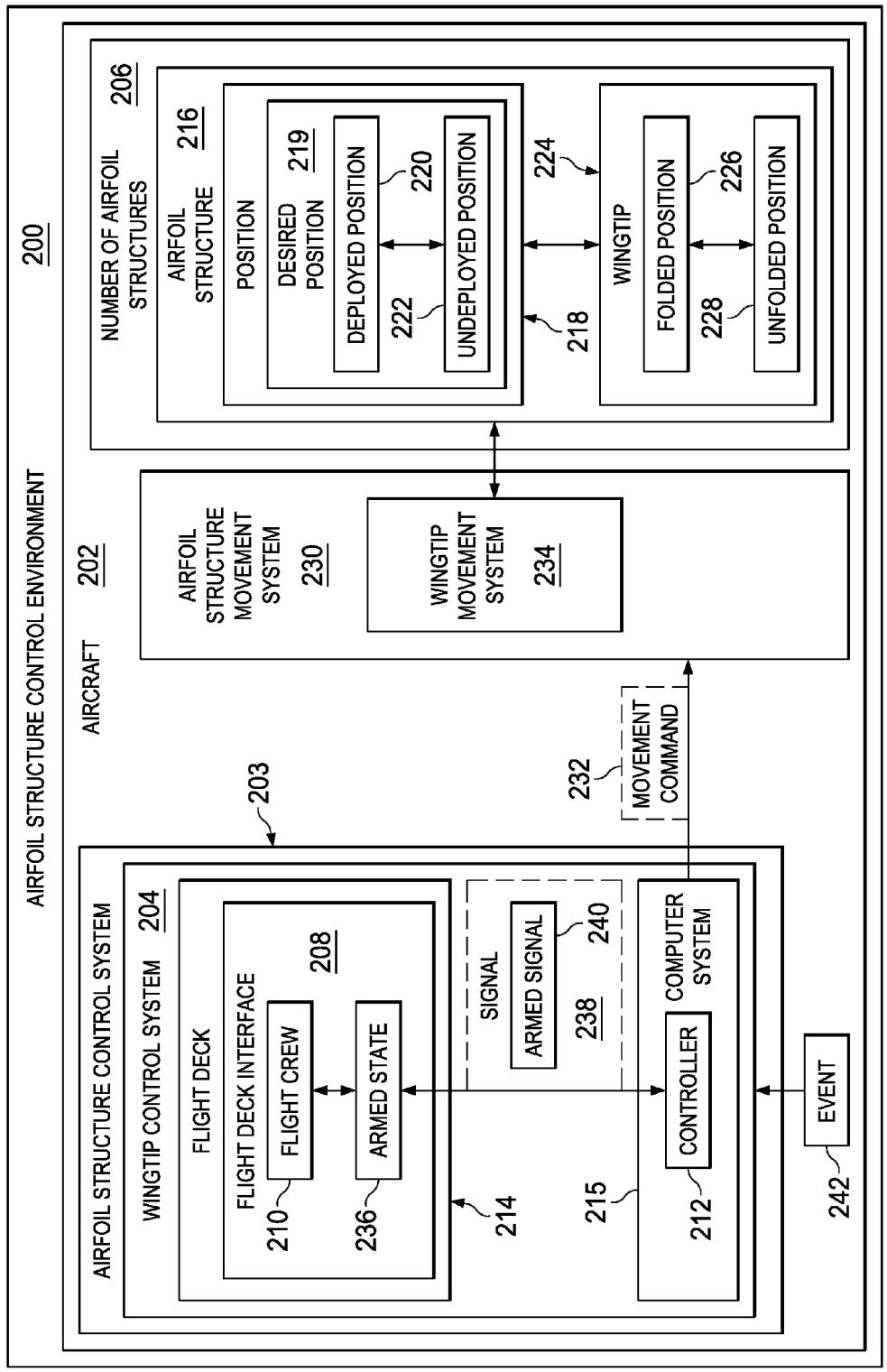
FIG. 2 is an illustration of a block diagram of an airfoil structure control environment in accordance with an illustrative embodiment.

With reference next to FIG. 2, an illustration of a block diagram of an airfoil structure control environment is depicted in accordance with an illustrative embodiment. In this illustrative example, airfoil structure control environment 200 is illustrated with aircraft 202. Aircraft 100 in FIG. 1 is one example of an implementation of aircraft 202 shown in this figure.

As illustrated, aircraft 202 includes airfoil structure control system 203. Airfoil structure control system 203 is configured to control number of airfoil structures 206. Wingtip control system 204 is an example of an airfoil control system that may be implemented in aircraft 100 to control the wingtips of aircraft 100 in FIG. 1.

In this illustrative example, wingtip control system 204 comprises flight deck interface 208 and controller 212. Controller 212 is in communication with flight deck interface 208 in these illustrative examples.

As depicted, flight deck interface 208 may be arranged within flight deck 214 of aircraft 202. Flight deck 214 is a control center in aircraft 202 from which flight crew 210 controls aircraft 202. Flight deck 214 may be referred to as a cockpit or a control cabin of aircraft 202 in some illustrative examples.

In other illustrative examples, the control center of aircraft 202 may be remote to aircraft 202. For instance, when aircraft 202 is an unmanned aerial vehicle, flight deck interface 208 may be located in an unmanned aerial vehicle control station.

In this illustrative example, flight deck 214 may include one or more instruments configured to operate aircraft 202. For example, flight crew 210 may operate number of airfoil structures 206 using one or more instruments in flight deck interface 208. In this illustrative example, flight crew 210 may include one or more pilots, personnel, and other individuals aboard aircraft 202, remote to aircraft 202, or a combination thereof, that are authorized to operate flight deck interface 208.

As depicted, flight deck interface 208 is configured to provide flight crew 210 access to installed systems, controls, indications, displays, and other suitable components. Flight deck interface 208 may be located in a number of different locations within flight deck 214. For example, flight deck interface 208 may be located on a glareshield, a console, a main instrument panel, an overhead panel, or other suitable locations within aircraft 202.

As illustrated, controller 212 is configured to move number of airfoil structures 206. In this illustrative example, controller 212 may be implemented in software, hardware, firmware, or a combination thereof. When software is used, the operations performed by controller 212 may be implemented using, for example, without limitation, program code configured to run on a processor unit. When firmware is used, the operations performed by controller 212 may be implemented using, for example, without limitation, program code and data and stored in persistent memory to run on a processor unit.

When hardware is employed, the hardware may include one or more circuits that operate to perform the operations in performed by controller. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, controller 212 may be included in computer system 215. Computer system 215 may be comprised of one or more computers. When more than one computer is present in computer system 215, those computers may be in communication with one another using a communications medium such as a network.

In this illustrative example, number of airfoil structures 206 is associated with aircraft 202. For example, number of airfoil structures 206 may be connected to the body of aircraft 202.

As used herein, when one component is "associated" with another component, the association is a physical association in the depicted examples. For example, a first component, such as number of airfoil structures 206, may be considered to be associated with a second component, such as aircraft 202, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

As depicted, number of airfoil structures 206 may include airfoil structure 216. Airfoil structure 216 may take a number of different forms. For example, without limitation, airfoil structure 216 may be selected from at least one of from a wingtip, a wing, a horizontal stabilizer, a vertical stabilizer, an airbrake, a control surface, a rudder, a flap, a spoiler, an aileron, a slat, or other suitable types of airfoil structures.

In this depicted example, airfoil structure 216 is configured to move relative to other structures in number of airfoil structures 206 in aircraft 202. For instance, position 218 of airfoil structure 216 may change during operation of aircraft 202. In this illustrative example, airfoil structure 216 is configured to move between deployed position 220 and undeployed position 222.

As illustrated, deployed position 220 may be a position of airfoil structure 216 in which airfoil structure 216 is used to perform an operation for aircraft 202. For example, deployed position 220 may be a position of airfoil structure 216 that increases aerodynamic performance of aircraft 202, moves aircraft 202 into a desired position, changes the speed of aircraft 202, releases a payload from aircraft 202, or performs some other suitable operation or function. Undeployed position 222 may be a position of airfoil structure 216 in which airfoil structure 216 is not being used to perform an operation for aircraft 202.

In this illustrative example, airfoil structure 216 is wingtip 224. Moveable portion 120 of wing 102 and moveable portion 122 of wing 104 in FIG. 1 are examples of implementations for wingtip 224. In other illustrative examples, airfoil structure 216 may be vertical stabilizer 118 in FIG. 1, or some other suitable type of airfoil structure.

As depicted, wingtip 224 is configured to move between folded position 226 and unfolded position 228 during various phases of flight of aircraft 202. For example, wingtip 224 may be moved between folded position 226 and unfolded position 228 prior to, during, or after at least one of taxiing, takeoff, ascent, cruising, decent, landing, or other suitable phases of flight of aircraft 202. In other illustrative examples, wingtip 224 may be moved between folded position 226 and unfolded position 228 when aircraft 202 is at rest.

In one illustrative example, wingtip 224 may be moved from folded position 226 to unfolded position 228 prior to takeoff of aircraft 202. In this instance, wingtip 224 is extended to provide increased surface area for a wing of aircraft 202. As a result, increased lift and aerodynamic performance may be realized.

In another illustrative example, wingtip 224 may be moved from unfolded position 228 to folded position 226 after landing aircraft 202. In this case, wingtip 224 is moved to folded position 226 to decrease the space required for aircraft 202 to maneuver about the landing location.

In still other illustrative examples, wingtip 224 may be moved from unfolded position 228 to folded position 226 such that aircraft 202 may be stored more easily in a hanger or other suitable location. In a similar fashion, other structures in number of airfoil structures 206 may be moved between deployed position 220 and undeployed position 222 to provide desired operation of aircraft 202, more easily store or maneuver aircraft 202, or a combination thereof.

As depicted, airfoil structure 216 is associated with airfoil structure movement system 230. In this illustrative example, airfoil structure movement system 230 moves airfoil structure 216 between deployed position 220 and undeployed position 222.

Airfoil structure movement system 230 may include a number of different components. For example, without limitation, airfoil structure movement system 230 may include at least one of sensors, latches, actuators, joints, and other suitable components configured to move airfoil structure 216. In this illustrative example, airfoil structure movement system 230 is configured to move airfoil structure 216 in response to movement command 232 sent by controller 212.

When airfoil structure 216 is wingtip 224, airfoil structure movement system 230 may be wingtip movement system 234. Wingtip movement system 234 is configured to move wingtip 224 between folded position 226 and unfolded position 228 in response to movement command 232 from controller 212.

In this depicted example, flight crew 210 places flight deck interface 208 into armed state 236. Armed state 236 of flight deck interface 208 is a state of flight deck interface 208 that corresponds to a desired movement for one of number of airfoil structures 206. In this instance, armed state 236 of flight deck interface 208 corresponds to a desired movement for airfoil structure 216.

In this illustrative example, flight crew 210 places flight deck interface 208 into armed state 236 prior to movement of airfoil structure 216. Armed state 236, however, does not necessitate movement of airfoil structure 216 at the time of placing flight deck interface 208 into armed state 236. In other words, armed state 236 of flight deck interface 208 does not directly result in movement of airfoil structure 216.

Instead, when flight crew 210 places flight deck interface 208 in armed state 236, signal 238 is generated. Signal 238 is armed signal 240 in this illustrative example. Signal 238 may be sent to controller 212 or controller 212 may query for signal 238 upon the occurrence of an event. Controller 212 waits for event 242 to occur before desired position 219 for airfoil structure 216 is visually indicated in flight deck interface 208 following the occurrence of event 242. In this illustrative example, desired position 219 may be deployed position 220 or undeployed position 222.

As illustrated, controller 212 is configured to receive signal 238 indicating that a change in position 218 of airfoil structure 216 is desired. Controller 212 may then visually indicate desired position 219 in flight deck interface 208 in response to event 242 occurring during operation of aircraft 202.

In this depicted example, controller 212 may visually indicate desired position 219 by changing the position of a switch in flight deck interface 208, flashing a graphical indicator in flight deck interface 208, sounding an audible alert, or otherwise indicating that a change in position of airfoil structure 216. In one illustrative example, controller 212 moves a switch from a first position to a second position in flight deck interface 208 in response to event 242. Movement command 232 may be generated in response to the change in position of the switch. In this example, the switch may be a command switch. In some examples, movement command 232 may be generated in response to signal 238 upon the occurrence of event 242.

In this illustrative example, event 242 is selected from at least one of a position of aircraft 202, a phase of flight of aircraft 202, a speed of aircraft 202, a position of a control surface in aircraft 202, or some other suitable event. In some examples, the occurrence of event 242 may correspond to the speed of aircraft 202 falling below or exceeding a threshold value. In further examples, the occurrence of event 242 may correspond to an indication of a transition of the aircraft from in-flight to on-ground position.

In some examples, flight deck interface 208 remains in armed state 236 until event 242 occurs. In response to event 242 occurring during operation of aircraft 202, controller 212 visually indicates desired position 219 in flight deck interface 208. For example, controller 212 may change the configuration of a switch in flight deck interface 208. Controller 212 may then send movement command 232 to move airfoil structure 216 without additional instructions from flight crew 210. In other words, controller 212 generates movement command 232 in response to visually indicating desired position 219 in flight deck interface 208. In this manner, controller 212 automatically moves airfoil structure 216 in response to flight deck interface 208 being in armed state 236, event 242 occurring during operation of aircraft 202, and desired position 219 being visually indicated in flight deck interface 208.

In some illustrative examples, more than one controller 212 may be present. In this case, a first controller may generate armed signal 240 and visually indicate desired position 219, while a second controller may generate movement command 232 in response to visual indication 239 and send movement command 232 to airfoil structure movement system 230.

In one illustrative example, flight crew 210 may place flight deck interface 208 into armed state 236 prior to takeoff of aircraft 202. Armed state 236 may indicate that unfolded position 228 is desired for wingtip 224 when event 242 occurs. Flight deck interface 208 sends armed signal 240 to controller 212, resulting in a visual indication of desired position 219 when event 242 occurs. Controller 212 may then send movement command 232 to move wingtip 224 to unfolded position 228.

In this illustrative example, event 242 may be a position of aircraft 202 on a runway. When aircraft 202 reaches this position on the runway, controller 212 visually indicates desired position 219 in flight deck interface 208, for example, by changing the configuration of a switch in flight deck interface 208, and then generates movement command 232 to move wingtip 224 to unfolded position 228 such that aircraft 202 may take off in a desired manner.

In other illustrative examples, flight deck interface 208 may be placed in armed state 236 prior to landing aircraft 202. Armed state 236 may indicate that folded position 226 is desired for wingtip 224 when event 242 occurs. Flight deck interface 208 sends armed signal 240 to controller 212 to visually indicate desired position 219 in flight deck interface 208 and generate movement command 232 to move wingtip 224 to folded position 226 when event 242 occurs. As one example, in response to event 242 and armed signal 240, controller 212 may change the configuration of a switch in flight deck interface 208, resulting in movement command 232 being generated from the change in configuration of the switch.

In this illustrative example, event 242 may be a speed of aircraft 202 after landing. For example, event 242 may be a speed reached by aircraft 202. For instance, the speed may be from about 20 knots to about 50 knots. When aircraft 202 slows to this speed on the runway, controller 212 automatically provides a visual indication of desired position 219 and then generates movement command 232 to move wingtip 224 to folded position 226 such that aircraft 202 may be maneuvered on the ground in a desired manner.

In still other illustrative examples, flight crew 210 may not place flight deck interface 208 in armed state 236 manually. Rather, flight deck interface 208 may be placed in armed state 236 automatically, without any intervention from flight crew 210. In still other illustrative examples, flight deck interface 208 may be operated manually through a wingtip control switch in flight deck interface 208, not using the armed switch in flight deck interface 208.

Although the illustrative examples are described with controller 212 located in aircraft 202, in other examples, controller 212 may be located remote to aircraft 202. For example, when aircraft 202 is an unmanned aerial vehicle, controller 212 may be located in a control station remote to aircraft 202.

Figure 3:
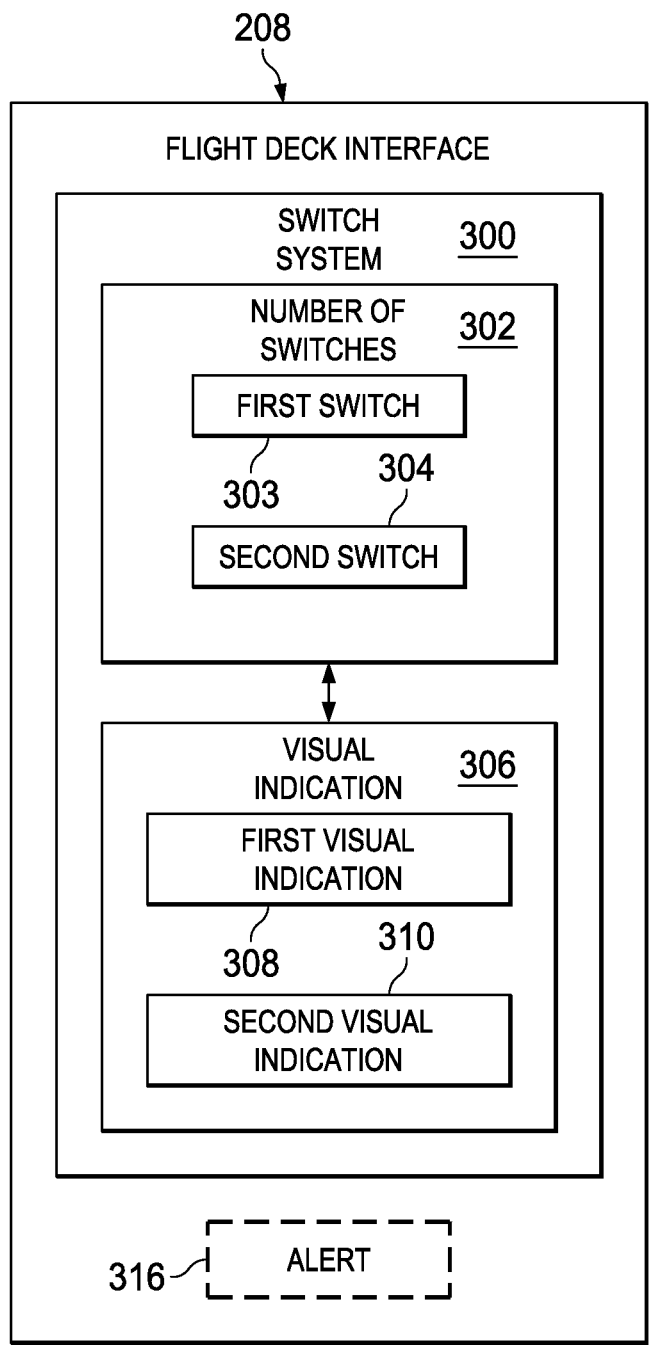
FIG. 3 is an illustration of a block diagram of a flight deck interface in accordance with an illustrative embodiment.

Turning next to FIG. 3, an illustration of a block diagram of a flight deck interface is depicted in accordance with an illustrative embodiment. In this depicted example, flight deck interface 208 in FIG. 2 is shown with switch system 300. Flight deck interface 208 may include other components not shown in this illustrative example.

As illustrated, switch system 300 includes number of switches 302. Number of switches 302 may be the same type or different types of switches.

In this illustrative example, switches in number of switches 302 may take various forms. For example, without limitation, one of number of switches 302 may be selected from one of a lever, a rotary knob, a button, a slider, a physical switch, a graphical switch displayed on a display device, or some other suitable type of switch. In some examples, the graphical switch may be activated using a cursor control device or a touch screen.

In this depicted example, switch system 300 includes first switch 303 and second switch 304 in number of switches 302. Switch system 300 is configured to be placed in armed state 236 prior to at least one of takeoff or landing of aircraft 202 as shown in FIG. 2. In particular, first switch 303 is configured to be placed in armed state 236. For example, when first switch 303 is a button, first switch 303 may be pressed by a member of flight crew 210 in FIG. 2 to place switch system 300 into armed state 236.

In response to first switch 303 being pressed by flight crew 210, flight deck interface 208 generates armed signal 240 and sends armed signal 240 to controller 212 in FIG. 2. Controller 212 then receives armed signal 240 from switch system 300. In response to armed signal 240 and event 242 in FIG. 2, controller 212 moves second switch 304. Movement command 232 is then generated and sent to wingtip movement system 234, resulting in movement of wingtip 224 in FIG. 2.

For example, when folded position 226 is desired for wingtip 224, controller 212 waits for event 242 to occur and then moves second switch 304 automatically to a position corresponding to folded position 226 of wingtip 224 in FIG. 2, resulting in wingtip 224 moving automatically to folded position 226 using wingtip movement system 234 after landing of aircraft 202. In a similar fashion, when unfolded position 228 in FIG. 2 is desired for wingtip 224, controller 212 waits for event 242 to occur and then moves second switch 304 automatically to a position corresponding to unfolded position 228 of wingtip 224, resulting in wingtip 224 moving automatically to unfolded position 228 using wingtip movement system 234 in FIG. 2 prior to takeoff of aircraft 202.

In other illustrative examples, when first switch 303 is a lever, the lever may be toggled to armed state 236. For instance, first switch 303 may be a lever with at least two positions corresponding to position 218 in FIG. 2 of wingtip 224. In one example, the lever may have a first position corresponding to folded position 226, a second position corresponding to unfolded position 228, and an intermediate position between the first position and the second position corresponding to armed state 236. When armed state 236 is desired, flight crew 210 may move the lever to the intermediate position.

In this illustrative example, controller 212 is further configured to visually indicate desired position 219 in FIG. 2 of wingtip 224 in response to armed signal 240 and event 242 occurring during operation of aircraft 202.

With respect to wingtip 224, after controller 212 receives armed signal 240 and event 242 occurs, controller 212 is configured to visually indicate desired position 219 of wingtip 224. For example, controller 212 may generate visual indication 306 in flight deck interface 208. Visual indication 306 may be a type of indicator corresponding to desired position 219 of wingtip 224.

Visual indication 306 may be selected from at least one of a position of second switch 304, a graphical indicator displayed on a display device, or some other suitable type of visual indication. For instance, visual indication 306 may be second switch 304 placed in a position corresponding to folded position 226 of wingtip 224.

Alternatively, when visual indication 306 is a graphical indicator, visual indication 306 may include an icon, text, highlighting, font, molding, animation, or other types of graphical indications. Visual indication 306 is displayed for flight crew 210 in flight deck interface 208. Visual indication 306 also may be displayed in other areas in flight deck 214 in FIG. 2 in other illustrative examples.

In one example, controller 212 is configured to generate visual indication 306 indicating desired position 219 of wingtip 224 prior to moving wingtip 224 to at least one of folded position 226 and unfolded position 228. In this manner, flight crew 210 may move second switch 304 back to its original position such that the movement disables armed state 236 of first switch 303. In other words, second switch 304 is configured to be moved manually by flight crew 210 between a first position and a second position to perform an operation selected from at least one of command movement of the wingtip or disable armed state 236 of the first switch. In this manner, flight crew 210 may manually override controller 212.

In still other illustrative examples, first switch 303 may not be activated. Instead, flight crew 210 may manually toggle second switch 304 to generate movement command 232 to move wingtip 224 to desired position 219.

In some cases, visual indication 306 may include first visual indication 308 and second visual indication 310. As depicted, first visual indication 308 corresponds to first switch 303, while second visual indication 310 corresponds to second switch 304.

When first switch 303 is placed into armed state 236, first visual indication 308 indicates that first switch 303 is in armed state 236. For instance, when first switch 303 is a button, the button may light up when placed in armed state 236.

In this illustrative example, second visual indication 310 may be displayed on or around second switch 304. For instance, when desired position 219 for wingtip 224 is unfolded position 228, second visual indication 310 may be displayed on second switch 304. In this case, second visual indication 310 may be a position of second switch 304 corresponding to unfolded position 228 of wingtip 224. For example, when second switch 304 is a lever, second switch 304 may be configured to move between a first position corresponding to folded position 226 of wingtip 224 and a second position corresponding to unfolded position 228 of wingtip 224.

In some instances, only one switch may be present in switch system 300. When only one switch is present in switch system 300, first switch 303 may indicate first visual indication 308 and second visual indication 310. For instance, first switch 303 may have an armed position for first visual indication 308, indicating that switch 304 has been placed in armed state 236, and second visual indication 310 may be displayed by first switch 303 subsequent to receiving armed signal 240 and event 242 occurring during operation of aircraft 202. In other words, first switch 303 may be moved from the armed position to a position corresponding to desired position 219 of wingtip 224 prior to movement of wingtip 224 in this illustrative example.

Although the illustrative embodiments have been described with reference to first switch 303 and second switch 304, a number of additional switches and corresponding visual indications may be present in flight deck interface 208. For instance, three switches, ten switches, fifteen switches, or other suitable numbers of switches may be used, depending on the number of wingtips, the complexity of wingtip control system 204, or a combination thereof. In other illustrative examples, multiple airfoil structures may be controlled by a single switch.

The illustration of wingtip control system 204 and flight deck interface 208 in FIG. 2 and FIG. 3 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, wingtip control system 204 also may include alert 316 displayed on flight deck interface 208. In this case, alert 316 may be an indication that first switch 303 should be placed in armed state 236. For instance, if first switch 303 has not been placed into armed state 236 prior to takeoff to move wingtip 224 to unfolded position 228, alert 316 may be generated. As a result, alert 316 may remind flight crew 210 to place first switch 303 into armed state 236 in a desired manner.

In this illustrative example, alert 316 may be a visual alert, an audible alert, or some other suitable type of alert indicating that first switch 303 should be placed in armed state 236. In other illustrative examples, alert 316 also may be generated in response to the failure of wingtip movement system 234 to move wingtip 224.

For instance, alert 316 may be generated if wingtip movement system 234 has a mechanical or electrical problem, preventing wingtip 224 from moving between deployed position 220 and undeployed position 222 in a desired manner. In this case, alert 316 may indicate to flight crew 210 that maintenance or other operations need to be performed on wingtip 224, wingtip movement system 234, or other components within aircraft 202.

Figure 4:
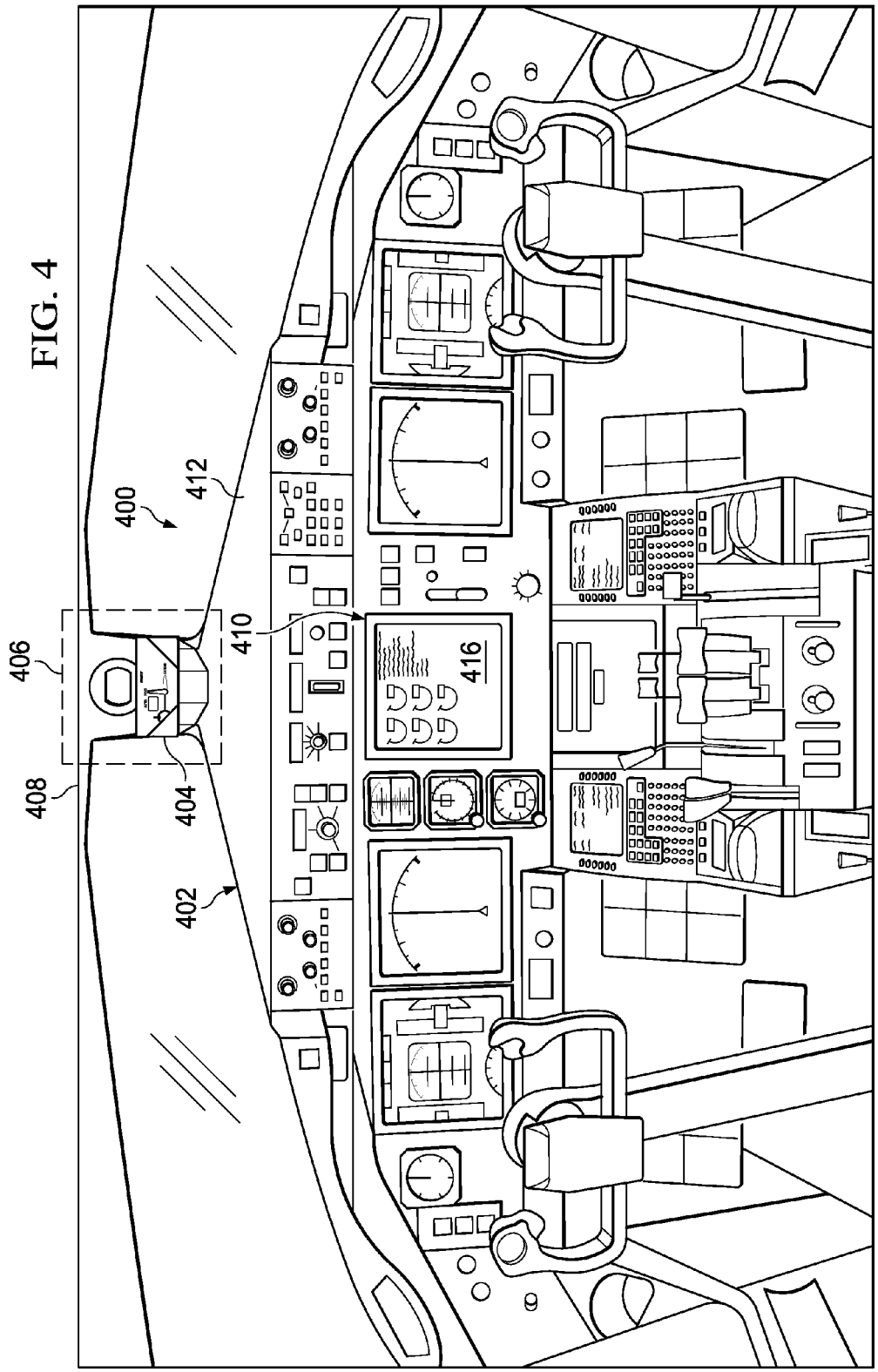
FIG. 4 is an illustration of a flight deck of an aircraft in accordance with an illustrative embodiment.

Turning next to FIG. 4, an illustration of a flight deck of an aircraft is depicted in accordance with an illustrative embodiment. In this illustrative example, flight deck 400 is one example of an implementation for flight deck 214 shown in block form in FIG. 2. Flight deck 400 may be located in aircraft 100 in FIG. 1.

As depicted, flight deck 400 includes number of instruments 402. Number of instruments 402 is used by flight crew 210 to perform operations for aircraft 202.

In this depicted example, flight deck interface 404 in section 406 of flight deck 400 is one of number of instruments 402. Flight deck interface 404 is an example of one implementation for flight deck interface 208 shown in block form in FIG. 2 and FIG. 3.

In this illustrative example, flight deck interface 404 is located in overhead panel 408 of flight deck 400. In other illustrative examples, flight deck interface 404 may be located in other areas of flight deck 400. For instance, in some examples, flight deck interface 404 may be located in main instrument panel 410, a console, glareshield 412, or in some other suitable location in flight deck 400, depending on the particular implementation.

In some illustrative examples, main instrument panel 410 may include a single display device or multiple display devices. Display device 416 is present in main instrument panel 410. Display device 416 may display one or more of number of instruments 402 in some illustrative examples.

FIGS. 5-15 show illustrations of flight deck interface 404 during various phases of flight of aircraft 202. The position of components within flight deck interface 404 changes during the different phases of flight. Alternative implementations for flight deck interface 404 are shown with reference to FIGS. 16-18.

Figure 5:
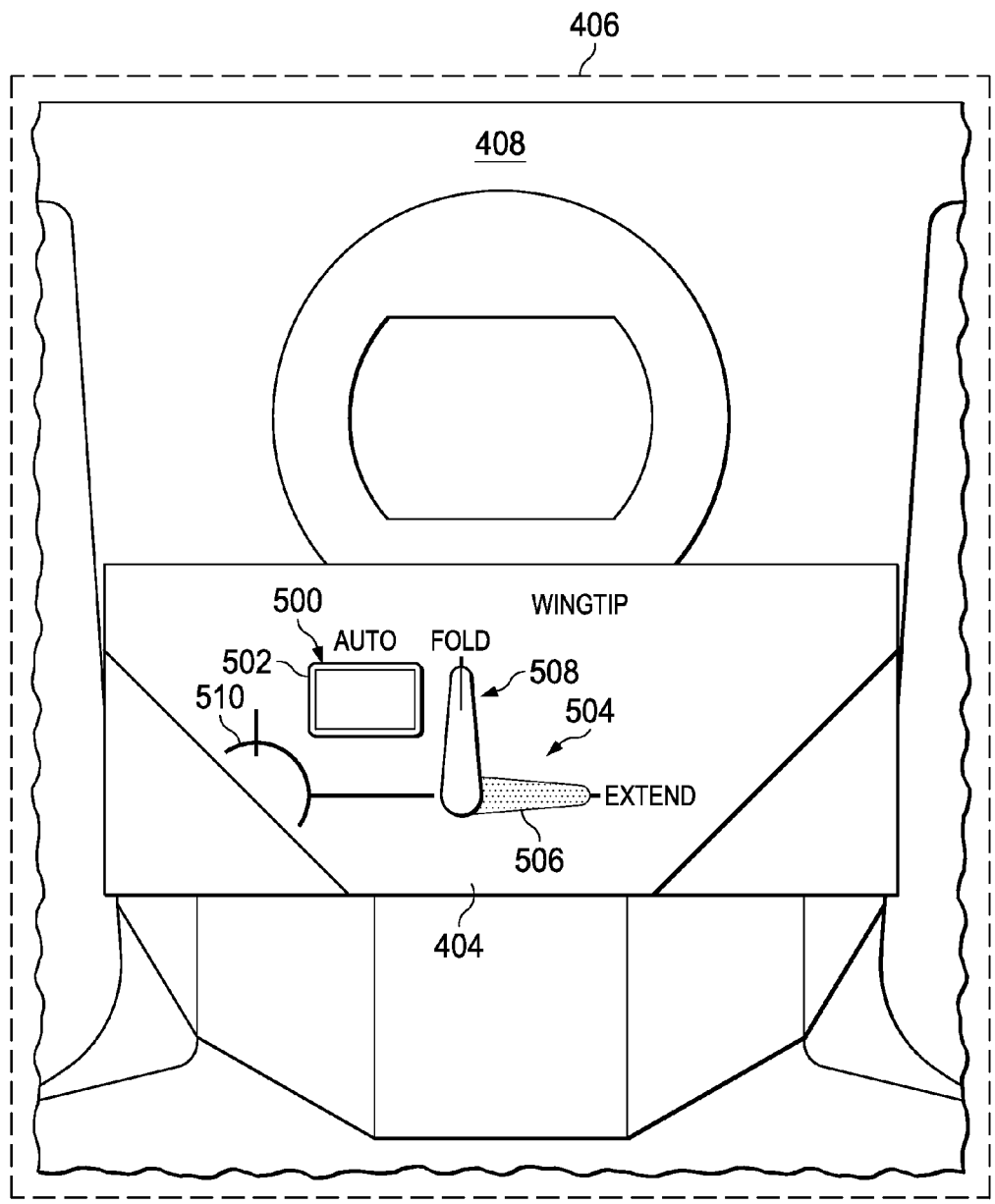
FIG. 5 is an illustration of an overhead panel with a flight deck interface in accordance with an illustrative embodiment.

Referring now to FIG. 5, an illustration of an overhead panel with a flight deck interface is depicted in accordance with an illustrative embodiment. In this illustrative example, flight deck interface 404 in section 406 of overhead panel 408 from FIG. 4 is shown in more detail.

As illustrated, flight deck interface 404 is an interface configured to control the wingtip of aircraft 202 shown in block form in FIG. 2. In particular, flight deck interface 404 is an interface configured to control wingtip 224 in FIG. 2. In other illustrative examples, flight deck interface 404 may be configured to control one or more other airfoil structures in number of airfoil structures 206 in FIG. 2.

In this illustrative example, flight deck interface 404 comprises switch system 500 with first switch 502 and second switch 504 arranged within flight deck interface 404. First switch 502 is a button, while second switch 504 is a lever in this illustrative example.

As illustrated, first switch 502 is configured to be placed in an armed state. When first switch 502 is placed in the armed state, an armed signal is generated and sent to a controller.

In this depicted example, second switch 504 is configured to move to a position corresponding to a desired position of the wingtip in aircraft 202. For instance, when an unfolded position for the wingtip is desired, the controller moves second switch 504 to first position 506 on flight deck interface 404. When a folded position for the wingtip is desired, the controller moves second switch 504 to second position 508. Movement of second switch 504 between first position 506 and second position 508 generates a movement command to move the wingtip to the desired position.

In this illustrative example, first position 506 and second position 508 are configured to mirror possible positions for a wingtip for the aircraft in which flight deck interface 404 is located. In other words, graphical indicator 510 may be configured to look like aircraft 202. Second switch 504 may be associated with graphical indicator 510 such that the movement of second switch 504 mirrors the movement of the wingtip to provide a more intuitive visual indication of the position of wingtip 224.

In this manner, when a folded position is desired for the wingtip, second switch 504 and graphical indicator 510 are moved to look like an aircraft with folded wingtips. The wingtips are then folded.

In a similar fashion, when an unfolded position is desired for the wingtip, second switch 504 and graphical indicator 510 are moved to look like an aircraft with unfolded wingtips. Thus, second switch 504 is configured to look like the wingtip extending from aircraft 202. The wingtips are then unfolded.

The location of first switch 502 and second switch 504 in flight deck interface 404 may vary in different illustrative examples. For instance, although first switch 502 is shown to the left of second switch 504, first switch 502 also may be placed in other locations relative to second switch 504. As an example, first switch 502 may be placed above, before, right, left, or in other locations on flight deck interface 404 relative to second switch 504.

In other illustrative examples, switch system 500 may include a single switch. For example, only second switch 504 may be present in switch system 500. In this case, an intermediate position between first position 506 and second position 508 of second switch 504 is used to place second switch 504 into the armed state. This embodiment is described in more detail with reference to FIG. 16.

In still other illustrative examples, graphical indicator 510 may be omitted. Further, when flight deck interface 404 is configured for another type of airfoil structure, graphical indicator 510, second switch 504, or both may be configured differently to provide an intuitive flight deck interface for the flight crew.

Figure 6:
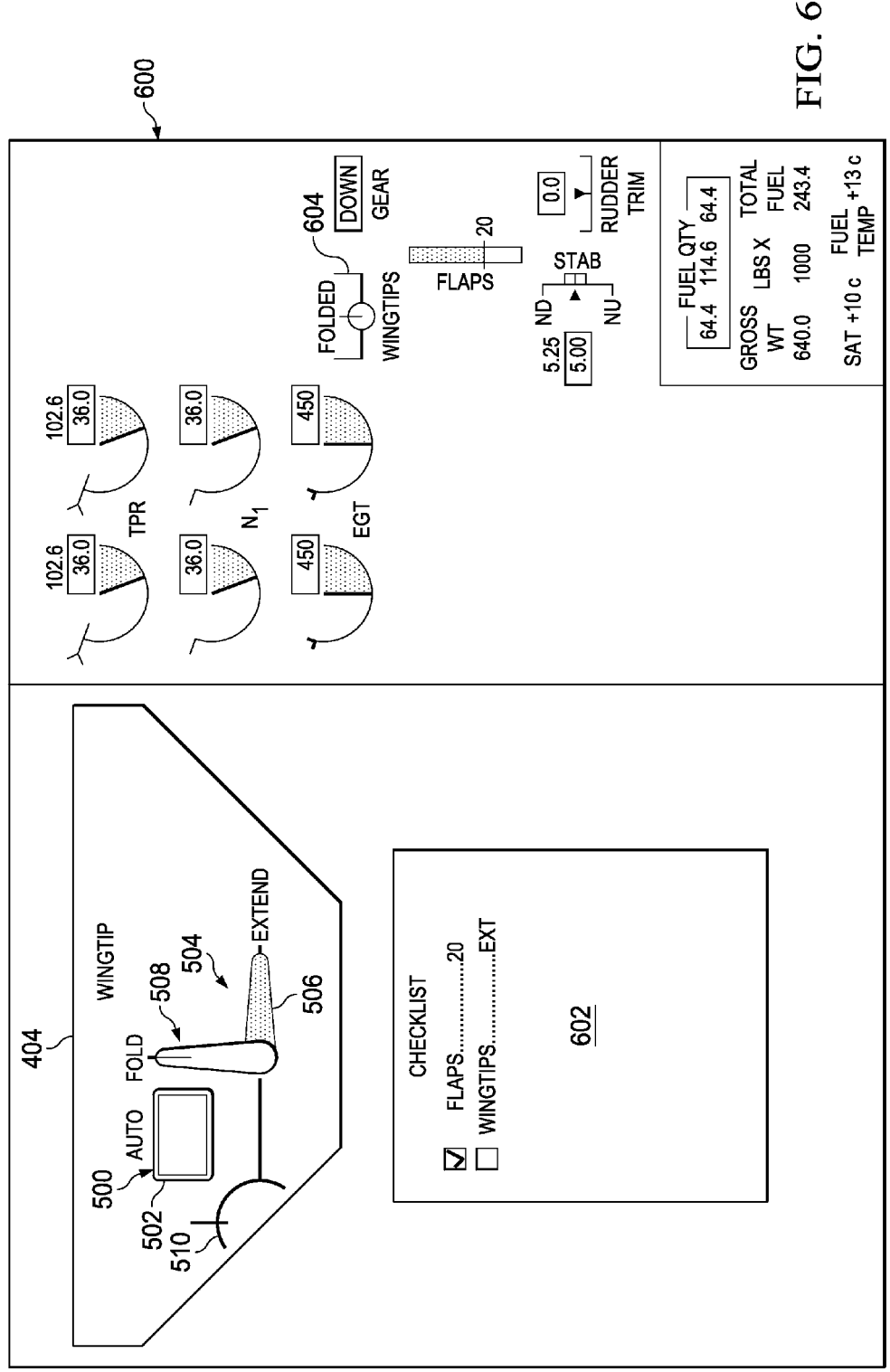
FIG. 6 is an illustration of a flight deck interface with a corresponding display and a checklist in accordance with an illustrative embodiment.

With reference next to FIG. 6, an illustration of a flight deck interface with a corresponding display and a checklist is depicted in accordance with an illustrative embodiment. In this depicted example, a more detailed view of flight deck interface 404 in section 406 of overhead panel 408 from FIG. 5 is shown. The position of flight deck interface 404 is illustrated prior to takeoff of aircraft 202 in FIG. 2 in this illustrative example.

In addition to flight deck interface 404, instruments 600 and checklist 602 are also depicted in this illustrative example. Flight deck interface 404, instruments 600, and checklist 602 are shown beside one another in FIGS. 6-15 for purposes of more clearly explaining an illustrative example. These components may not be located near one another in flight deck 400 in FIG. 4.

For instance, instruments 600, checklist 602, or both may be shown in a portion of display device 416 in main instrument panel 410 in FIG. 4. Checklist 602 may be a paper checklist or a digital checklist used by the flight crew in some illustrative examples. In other illustrative examples, instruments 600 may be located elsewhere in flight deck 400.

Flight deck interface 404, instruments 600, and checklist 602 may be integrated to visually indicate information in response to a change in one of flight deck interface 404, instruments 600, and checklist 602. For instance, when a change is made to flight deck interface 404, that change may be reflected in at least one of instruments 600 or checklist 602.

Checklist 602 is a checklist for members of a flight crew to perform desired operations. In this illustrative example, checklist 602 is a checklist used by the flight crew prior to takeoff of aircraft 202. Checklist 602 instructs the flight crew to extend the wingtips of aircraft 202. In other words, checklist 602 instructs the flight crew to place the wingtip in an unfolded position before takeoff.

In this depicted example, flight deck interface 404 visually indicates that the wingtip was commanded to move to a folded position. In other words, flight deck interface 404 changes configuration in response to an event and an armed command. In this depicted example, second switch 504 in flight deck interface 404 is in second position 508 corresponding to the folded position of the wingtip. Status identifier 604 in instruments 600 also indicates that the wingtips of aircraft 202 are in a folded position.

Figure 7:
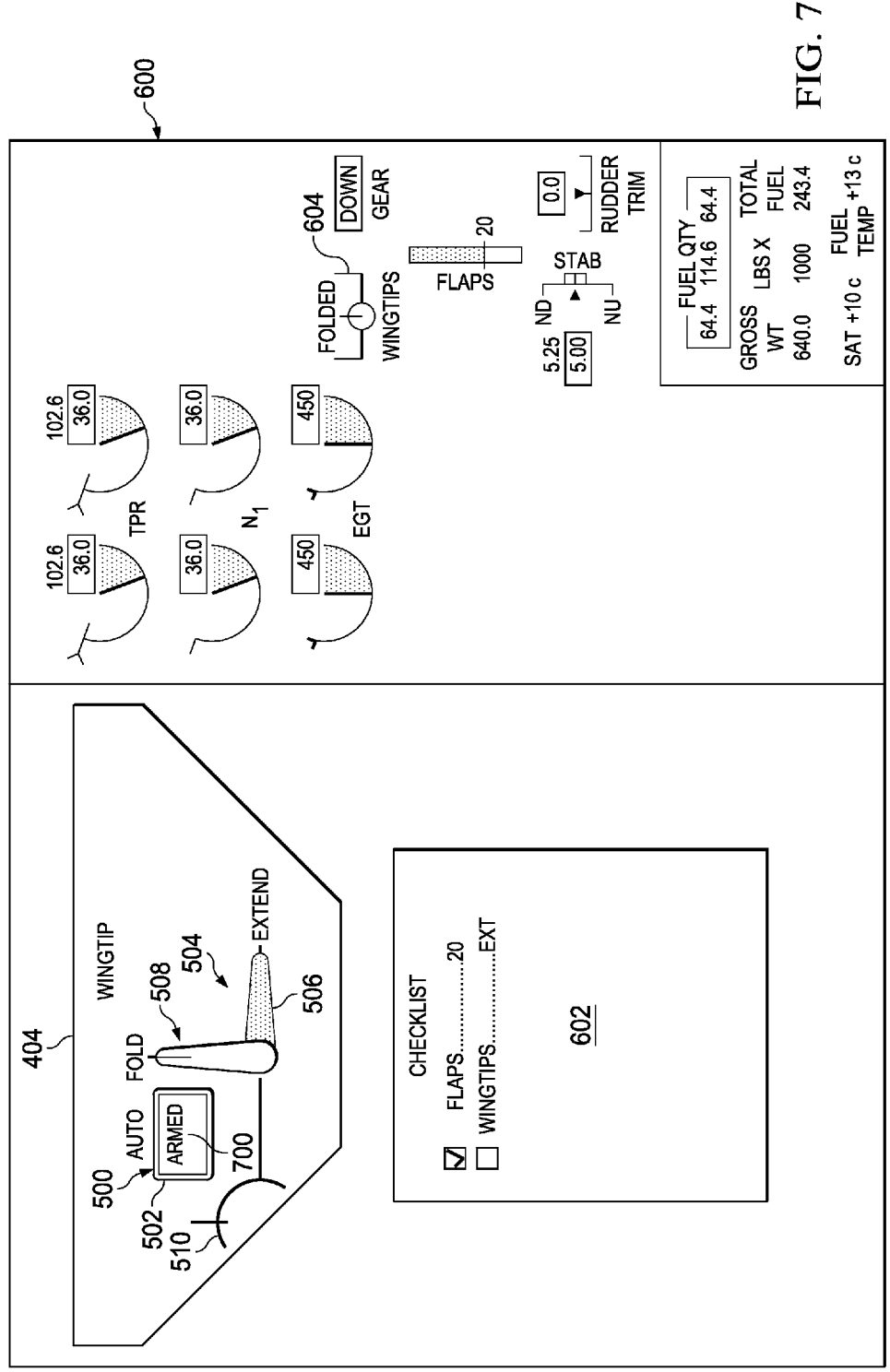
FIG. 7 is another illustration of a flight deck interface with a corresponding display and a checklist in accordance with an illustrative embodiment.

In FIG. 7, another illustration of a flight deck interface with a corresponding display and a checklist is depicted in accordance with an illustrative embodiment. In this depicted example, flight deck interface 404 from FIG. 6 is illustrated prior to takeoff of aircraft 202.

As illustrated, first switch 502 has been placed in the armed state. Visual indication 700 is shown on first switch 502. Visual indication 700 indicates that first switch 502 is in the armed state.

No movement of the wingtips has occurred at this point in time. Instead, the controller waits for an event to occur to move second switch 504 and subsequently extend the wingtips. Status identifier 604 and checklist 602 show that no movement of the wingtips of aircraft 202 has occurred. In some illustrative examples, status identifier 604 may indicate that the wingtips are armed to extend.

Figure 8:
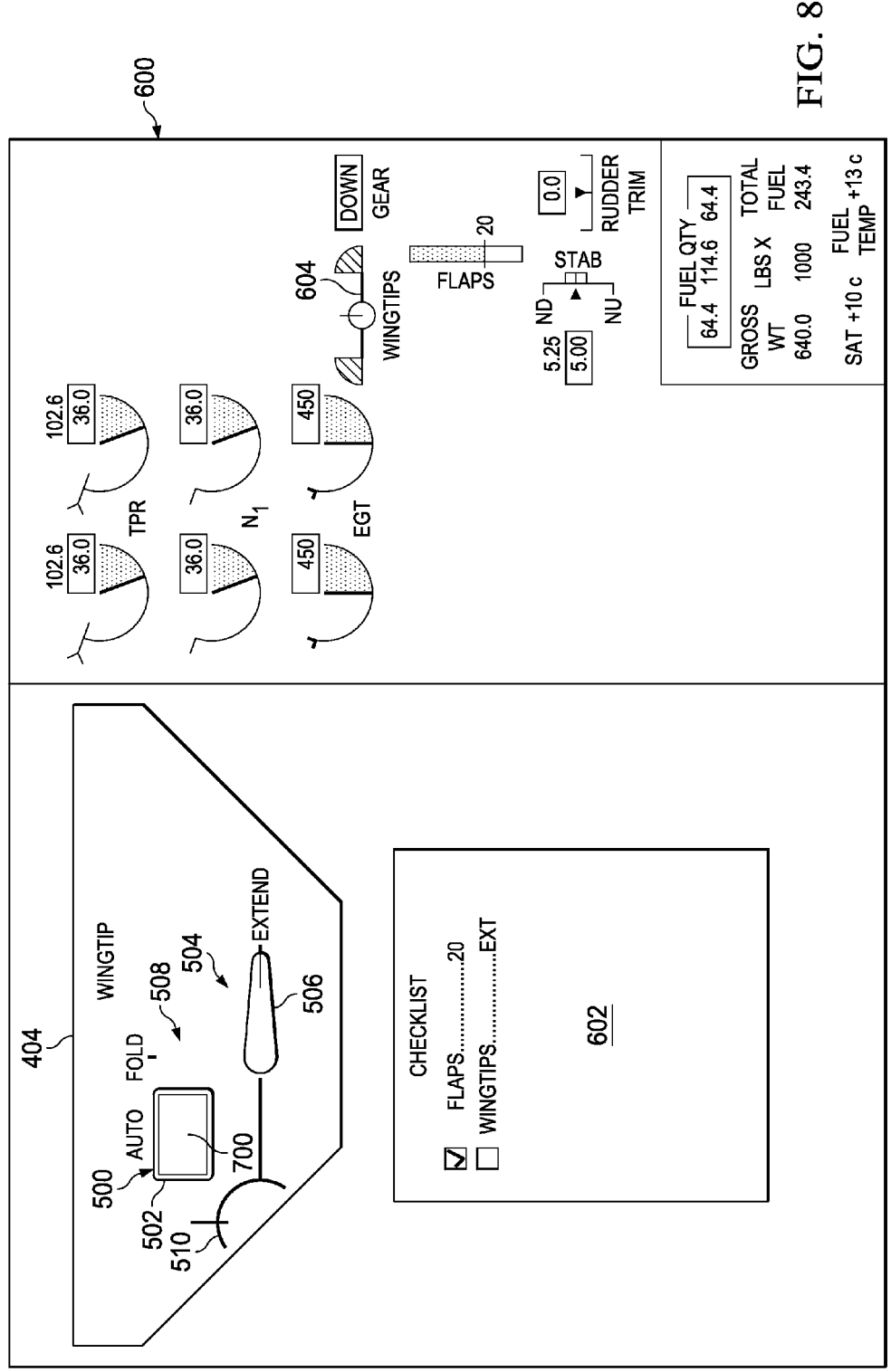
FIG. 8 is another illustration of a flight deck interface with a corresponding display and a checklist in accordance with an illustrative embodiment.

Turning now to FIG. 8, another illustration of a flight deck interface with a corresponding display and a checklist is depicted in accordance with an illustrative embodiment. In this depicted example, flight deck interface 404 from FIG. 6 is shown. The position of flight deck interface 404 is illustrated when the wingtips of aircraft 202 are being extended in this illustrative example.

In this illustrative example, the event has occurred. For instance, aircraft 202 shown in block form in FIG. 2 may have reached a desired speed. To extend the wingtip, second switch 504 has been moved by the controller to first position 506, indicating to the controller to extend the wingtip.

Before the wingtips extend, the flight crew may manually override the automatic movement of the wingtips by moving second switch 504 back to second position 508 corresponding to the folded position for the wingtips if desired. If a manual override is not needed, the controller will automatically move the wingtips in response to the movement of second switch 504. Checklist 602 and status identifier 604 show that the wingtips have not been extended in this illustrative example.

Figure 9:
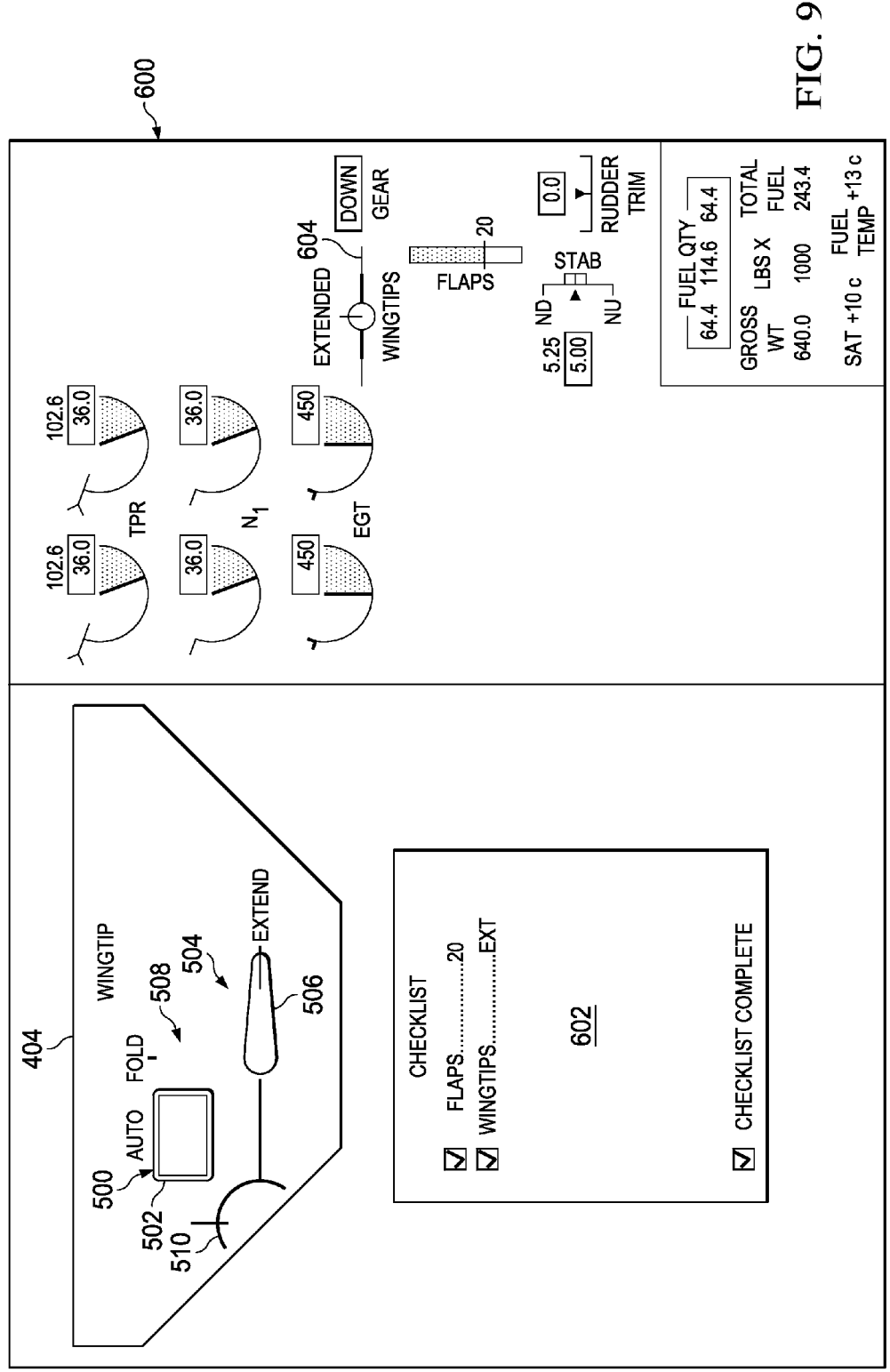
FIG. 9 is yet another illustration of a flight deck interface with a corresponding display and a checklist in accordance with an illustrative embodiment.

With reference next to FIG. 9, yet another illustration of a flight deck interface with a corresponding display and a checklist is depicted in accordance with an illustrative embodiment. In this depicted example, flight deck interface 404 from FIG. 6 is shown. The position of flight deck interface 404 is illustrated prior to takeoff of aircraft 202 shown in block form in FIG. 2 after the wingtips of aircraft 202 have been extended.

Both status identifier 604 and checklist 602 also indicate the change in position of the wingtips. Checklist 602 also indicates that all conditions have been met such that aircraft 202 may takeoff.

In this depicted example, visual indication 700 is no longer present in first switch 502. In other words, after the wingtips are moved to the unfolded position, visual indication 700 is removed from flight deck interface 404.

Figure 10:
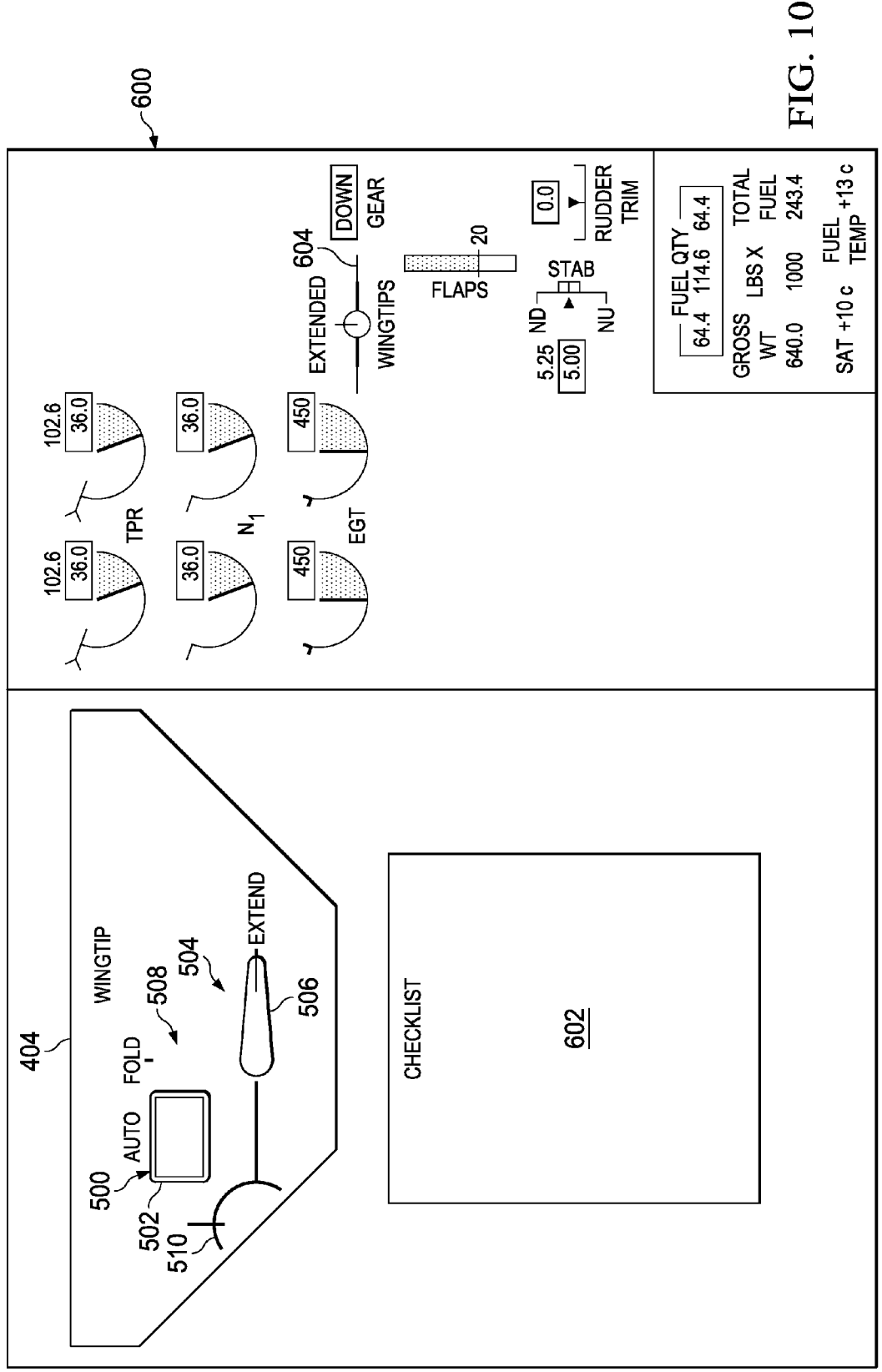
FIG. 10 is yet another illustration of a flight deck interface with a corresponding display and a checklist in accordance with an illustrative embodiment.

In FIG. 10, yet another illustration of a flight deck interface with a corresponding display and a checklist is depicted in accordance with an illustrative embodiment. In this depicted example, flight deck interface 404 from FIG. 9 is shown. The position of flight deck interface 404 is illustrated while aircraft 202 is in flight. The wingtips remain extended during flight of aircraft 202 shown in block form in FIG. 2 in these illustrative examples.

Figure 11:
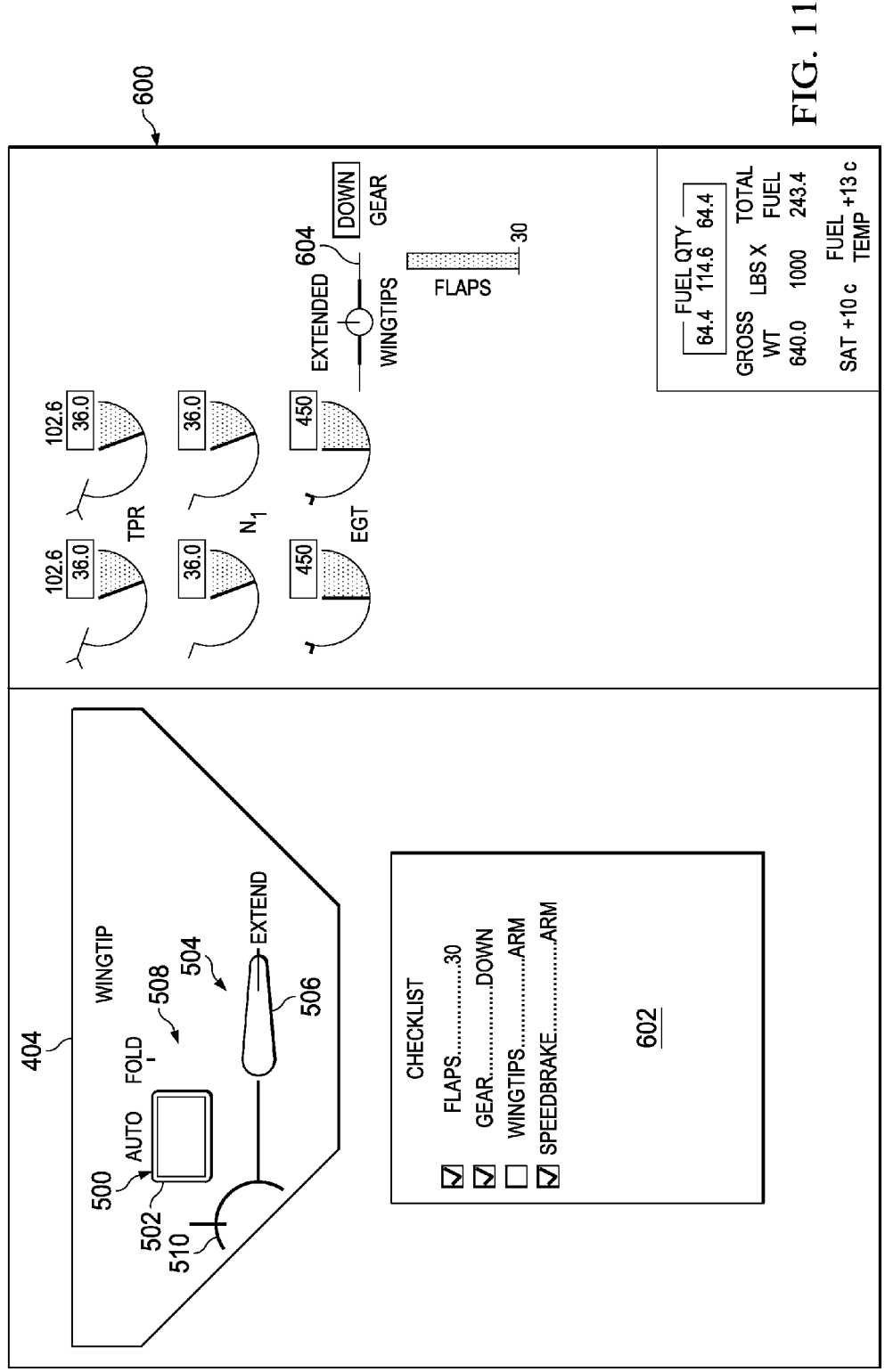
FIG. 11 is still another illustration of a flight deck interface with a corresponding display and a checklist in accordance with an illustrative embodiment.

Turning next to FIG. 11, still another illustration of a flight deck interface with a corresponding display and a checklist is depicted in accordance with an illustrative embodiment. In this depicted example, flight deck interface 404 from FIG. 10 is shown. The position of flight deck interface 404 is illustrated during approach of aircraft 202 shown in block form in FIG. 2 prior to landing aircraft 202.

The wingtips of aircraft 202 remain extended during approach of aircraft 202 in these illustrative examples. Checklist 602 now indicates to the flight crew that first switch 502 should be placed in an armed state.

Figure 12:
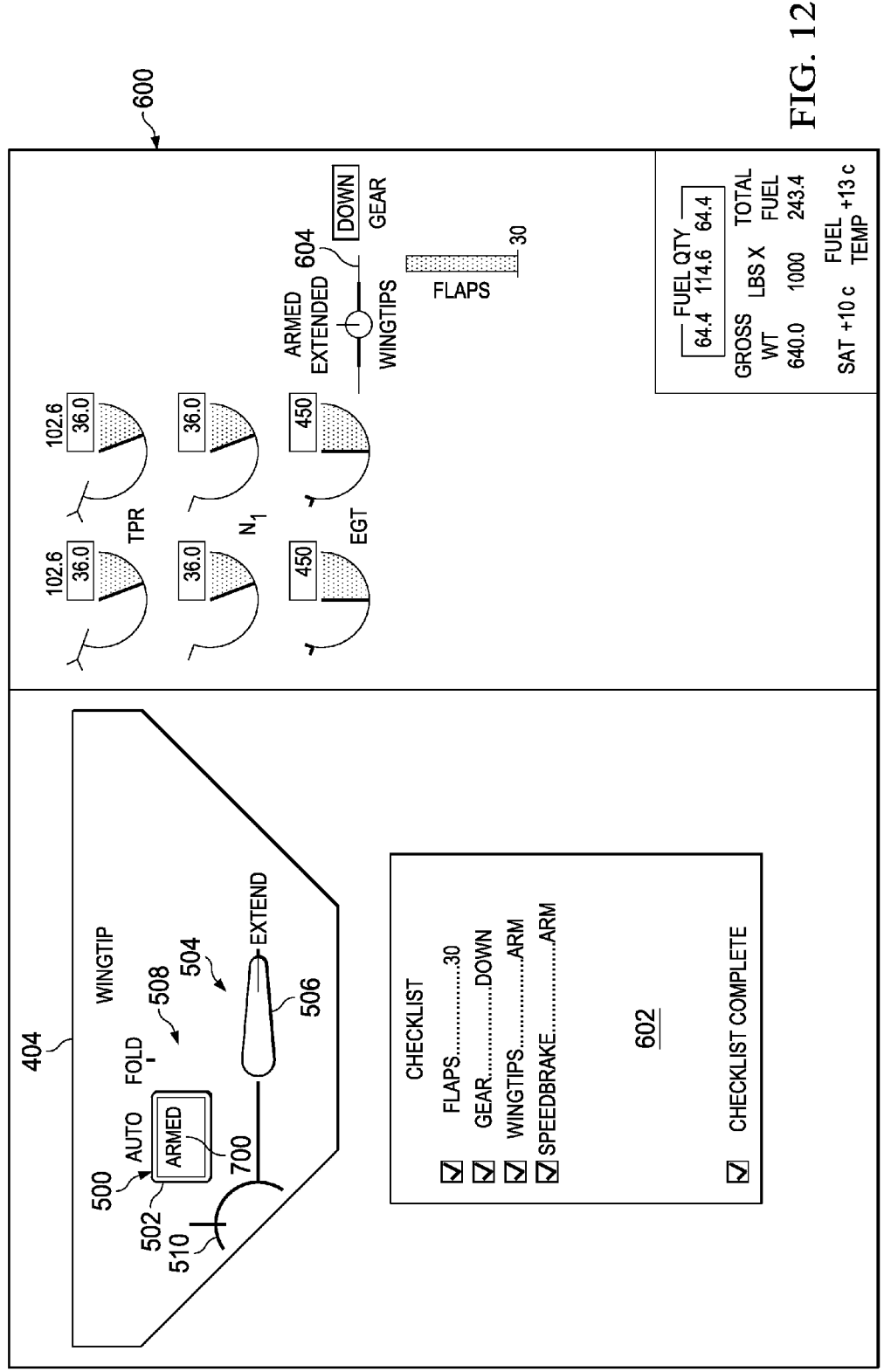
FIG. 12 is still another illustration of a flight deck interface with a corresponding display and a checklist in accordance with an illustrative embodiment.

With reference next to FIG. 12, still another illustration of a flight deck interface with a corresponding display and a checklist is depicted in accordance with an illustrative embodiment. In this depicted example, flight deck interface 404 from FIG. 11 is shown. The position of flight deck interface 404 is illustrated during approach of aircraft 202 shown in block form in FIG. 2 prior to landing aircraft 202.

As illustrated, first switch 502 has been placed in the armed state. An armed signal is then sent to the controller to move second switch 504 when an event occurs, resulting in movement of the wingtips.

In this illustrative example, visual indication 700 indicates that first switch 502 is in the armed state to move second switch 504 to second position 508 and move the wingtips to the folded position. Both checklist 602 and status identifier 604 show that first switch 502 is armed. Checklist 602 also indicates that aircraft 202 is ready for landing.

Figure 13:
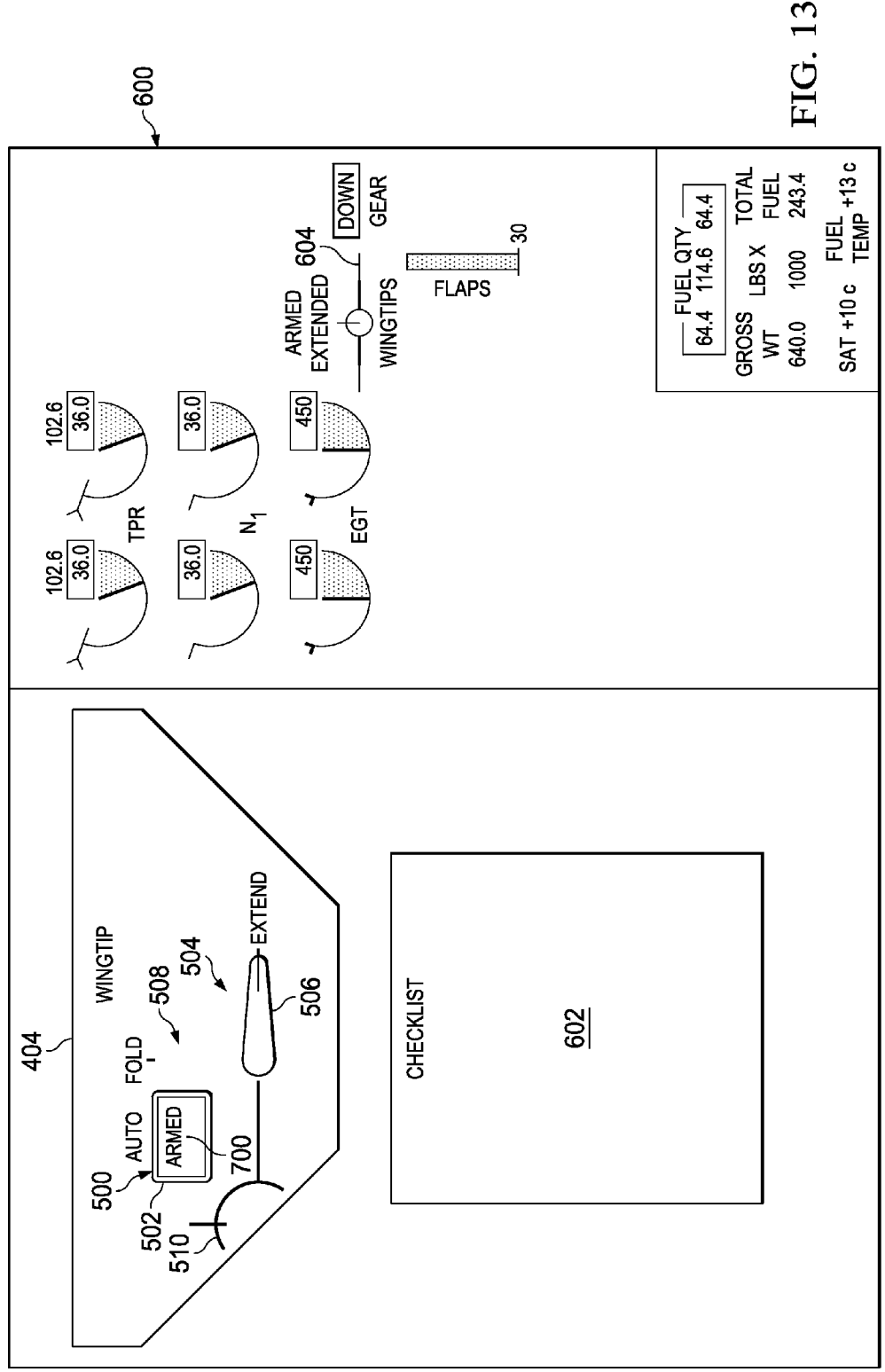
FIG. 13 is yet another illustration of a flight deck interface with a corresponding display and a checklist in accordance with an illustrative embodiment.

In FIG. 13, yet another illustration of a flight deck interface with a corresponding display and a checklist is depicted in accordance with an illustrative embodiment. In this depicted example, aircraft 202 shown in block form in FIG. 2 has landed. No movement of the wingtips has occurred, as the event has not yet occurred to move second switch 504 to second position 508 to move the wingtips. First switch 502 remains in the armed state.

Figure 14:
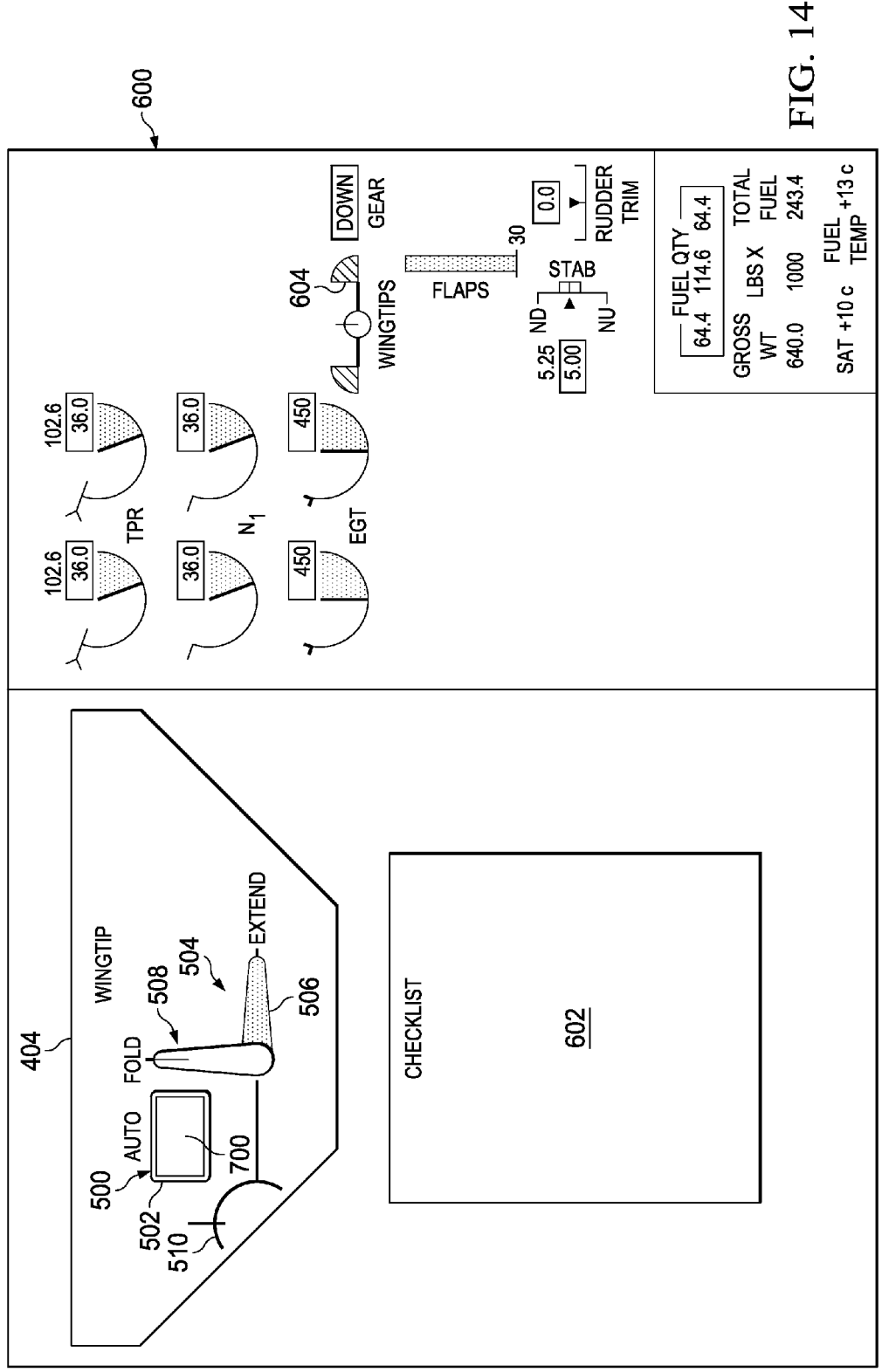
FIG. 14 is yet another illustration of a flight deck interface with a corresponding display and a checklist in accordance with an illustrative embodiment.

With reference next to FIG. 14, yet another illustration of a flight deck interface with a corresponding display and a checklist is depicted in accordance with an illustrative embodiment. In this depicted example, the event has occurred and the controller has automatically moved second switch 504 to second position 508.

As illustrated, the event may be a speed of aircraft 202 shown in block form in FIG. 2 after landing. For instance, when the speed of aircraft 202 reaches 30 knots, the controller may be configured to move second switch 504 to second position 508 such that wingtip 224 is folded.

Status identifier 604 also indicates that the wingtips are in transit to the fold position. The flight crew may manually override the command to move the wingtips at this time, or before. Visual indication 700 is no longer present in flight deck interface 404 after the event occurs.

Figure 15:
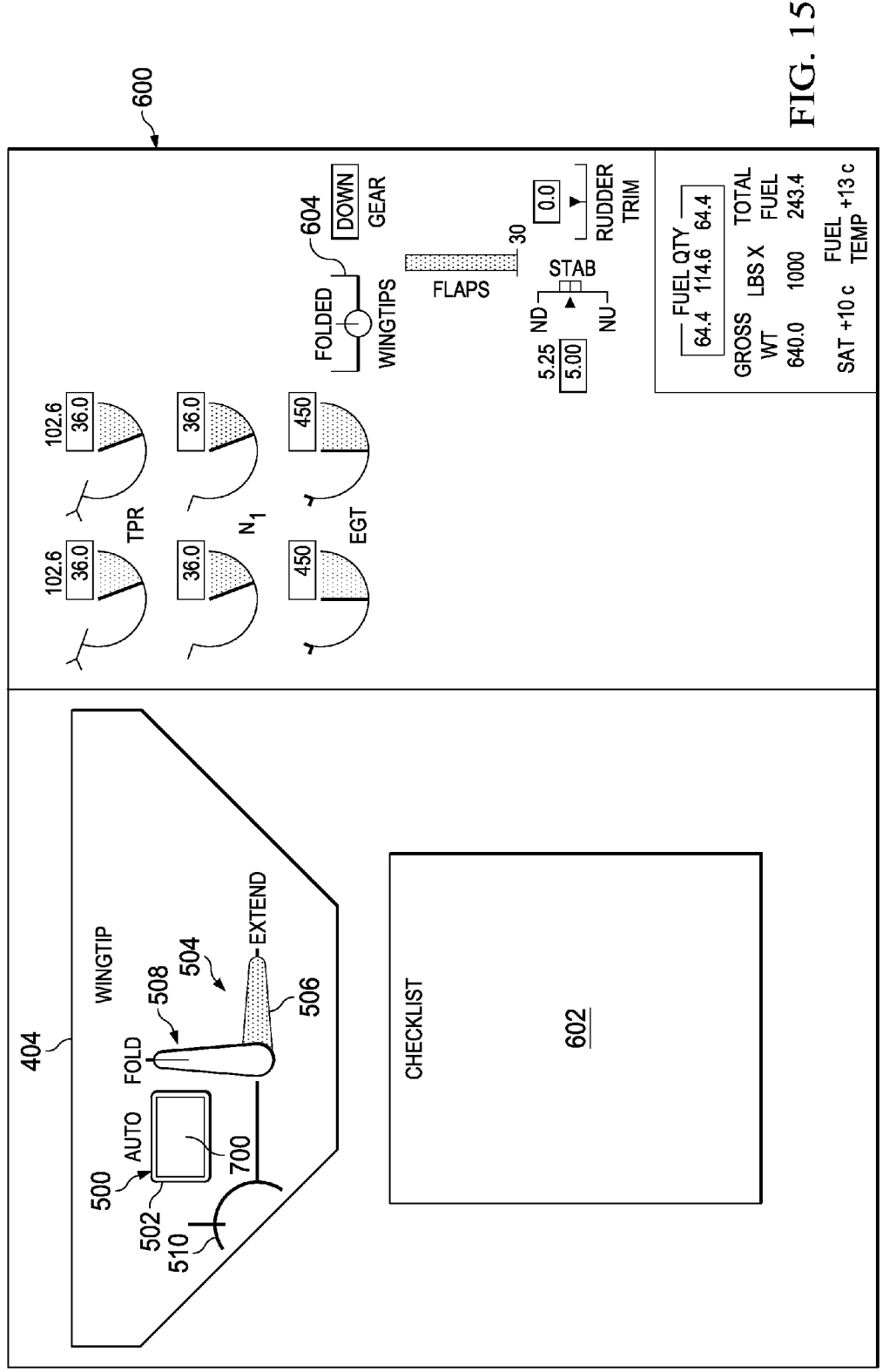
FIG. 15 is yet another illustration of a flight deck interface with a corresponding display and a checklist in accordance with an illustrative embodiment.

Turning now to FIG. 15, yet another illustration of a flight deck interface with a corresponding display and a checklist is depicted in accordance with an illustrative embodiment. In this illustrative example, aircraft 202 shown in block form in FIG. 2 is on a taxiway. The wingtips of aircraft 202 remain in a folded position and second switch 504 remains in second position 508 corresponding to the folded position of the wingtips. Status identifier 604 also indicates that the wingtips are in the folded position.

Although the implementations of an illustrative embodiment in FIGS. 5-15 show flight deck interface 404 being located in section 406 of overhead panel 408 in flight deck 400, flight deck interface 404 may be located in other portions of flight deck 400.

Moreover, flight deck interface 404 may take other forms other than first switch 502 and second switch 504. For instance, flight deck interface 404 may be a lever located on glareshield 412 of flight deck 400. The lever may be configured to move between a first position and a second position, commanding the wingtips to a folded position or unfolded position, as described above.

In this case, the flight crew moves the lever into an intermediate position to place the lever into an armed state for moving the wingtip to the undeployed position. Once the event occurs, the controller moves the lever to a position on glareshield 412 corresponding to the undeployed position of the wingtip. In this manner, the controller automatically moves the lever to provide a visual indication of the desired position of the wingtip to the flight crew. The controller then moves the wingtip, if no manual override of the automatic control occurs.

Figure 16:
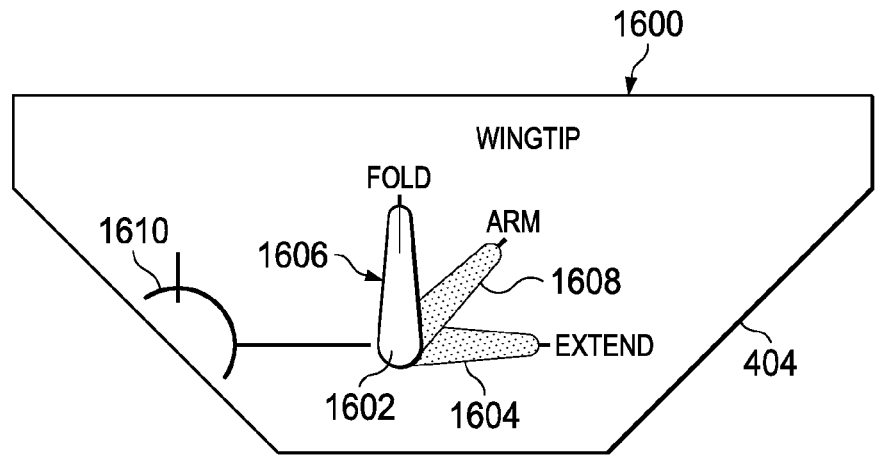
FIG. 16 is an illustration of a flight deck interface in accordance with an illustrative embodiment.

Referring now to FIG. 16, an illustration of a flight deck interface is depicted in accordance with an illustrative embodiment. In this illustrative example, flight deck interface 404 from FIG. 4 is shown with switch system 1600 to control wingtip 224 in FIG. 2.

In this illustrative example, flight deck interface 404 comprises switch system 1600 with switch 1602 arranged within flight deck interface 404. Switch 1602 is a lever in this illustrative example.

As depicted, switch 1602 is configured to be placed in an armed state. When switch 1602 is placed in the armed state, an armed signal is generated and sent to a controller.

In this depicted example, switch 1602 is also configured to move to a position corresponding to a desired position of the wingtips in aircraft 202 shown in block form in FIG. 2 to generate a movement command for the wingtips. For instance, when an unfolded position for the wingtips is desired and an event occurs, the controller moves switch 1602 to first position 1604 on flight deck interface 404. When a folded position of the wingtips is desired and an event occurs, the controller moves switch 1602 to second position 1606.

In this illustrative example, first position 1604 and second position 1606 are configured to mirror the position of the wingtips of aircraft 202, as described above. In a similar fashion as graphical indicator 510, graphical indicator 1610 may be configured to look like aircraft 202.

As depicted, switch 1602 has intermediate position 1608 between first position 1604 and second position 1606. Intermediate position 1608 is used to place switch 1602 into an armed state and send an armed signal to the controller.

Figure 17:
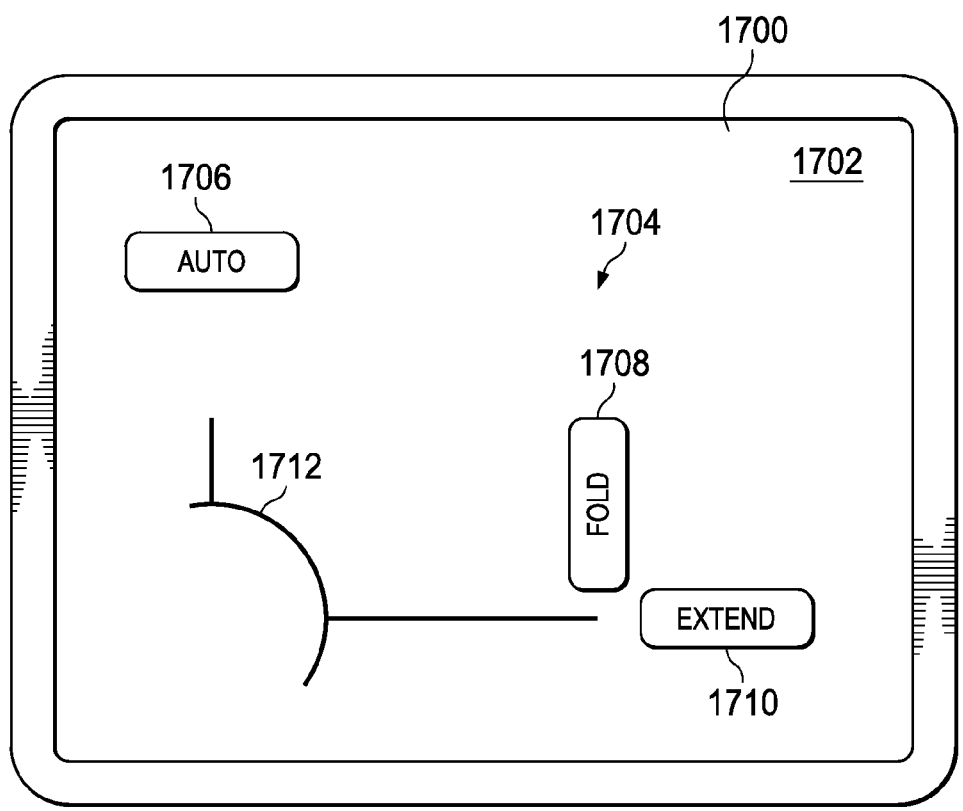
FIG. 17 is another illustration of a flight deck interface in accordance with an illustrative embodiment.

Turning next to FIG. 17, another illustration of a flight deck interface is depicted in accordance with an illustrative embodiment. In this illustrative example, flight deck interface 1700 is another example of an implementation for flight deck interface 208 shown in block form in FIG. 2. Flight deck interface 1700 may be used by a flight crew to control wingtips of aircraft 202 shown in block form in FIG. 2 in these illustrative examples.

As depicted, flight deck interface 1700 has touch screen 1702. Switch system 1704 is displayed on touch screen 1702.

In this illustrative example, switch system 1704 includes graphical switch 1706, graphical switch 1708, and graphical switch 1710. Graphical indicator 1712 is also shown on touch screen 1702 and is configured to resemble aircraft 202.

As illustrated, graphical switch 1706 is configured to be placed into an armed state. For instance, the flight crew may touch graphical switch 1706 to place graphical switch 1706 in the armed state.

In response to the flight crew touching graphical switch 1706, flight deck interface 1700 may display a first visual indication (not shown in this view) that graphical switch 1706 is armed. As an example, graphical switch 1706 may light up in a certain color, for example, a green color, on touch screen 1702. As another example, text may be displayed on or around graphical switch 1706 indicating that graphical switch 1706 is in the armed state.

As depicted, graphical switch 1708 and graphical switch 1710 correspond to a folded position desired for the wingtips of aircraft 202 and an unfolded position desired for the wingtips of aircraft 202, respectively. In other words, graphical switch 1708 corresponds to a folded command for the wingtips while graphical switch 1710 corresponds to an unfolded command for the wingtips.

Figure 18:
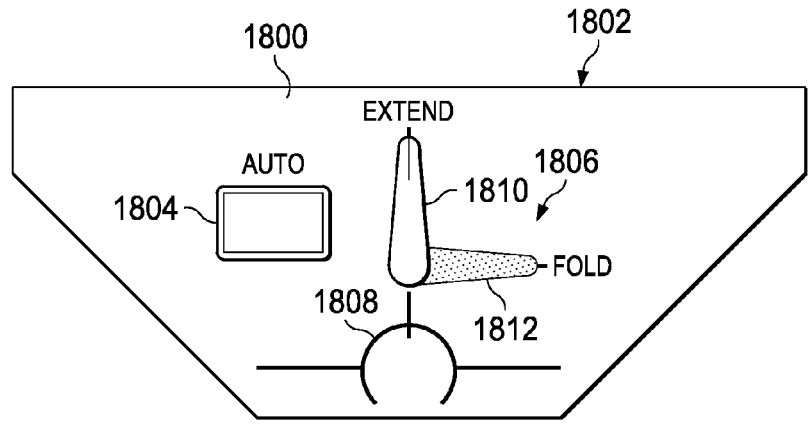
FIG. 18 is yet another illustration of a flight deck interface in accordance with an illustrative embodiment.

In FIG. 18, yet another illustration of a flight deck interface is depicted in accordance with an illustrative embodiment. In this depicted example, flight deck interface 1800 is another example of an implementation for flight deck interface 208 shown in block form in FIG. 2. Flight deck interface 1800 is configured to control operation of vertical stabilizer 118 in FIG. 1.

As depicted, flight deck interface 1800 includes switch system 1802 with first switch 1804 and second switch 1806. First switch 1804 is configured to be placed in an armed state, while second switch 1806 indicates a position of vertical stabilizer 118.

In this depicted example, graphical indicator 1808 is configured to resemble aircraft 100 in FIG. 1. Second switch 1806 is associated with graphical indicator 1808 and moves as vertical stabilizer 118 would move between a deployed position and an undeployed position. In this manner, flight deck interface 1800 provides control of vertical stabilizer 118 that is more intuitive than some currently used systems.

As illustrated, second switch 1806 moves between first position 1810 corresponding to a deployed position desired for vertical stabilizer 118 and second position 1812 corresponding to an undeployed position desired for vertical stabilizer 118. In other words, movement of second switch 1806 between first position 1810 and second position 1812 may command vertical stabilizer 118 to move between a deployed position and an undeployed position. Second switch 1806 is moved by a controller prior to movement of vertical stabilizer 118 by an airfoil structure movement system.

The different components shown in FIGS. 4-18 may be illustrative examples of how components shown in block form in FIG. 2 and FIG. 3 can be implemented as physical structures. Additionally, some of the components in FIGS. 4-18 may be combined with components in FIG. 2 and FIG. 3, used with components in FIG. 2 and FIG. 3, or a combination of the two.

Figure 19:
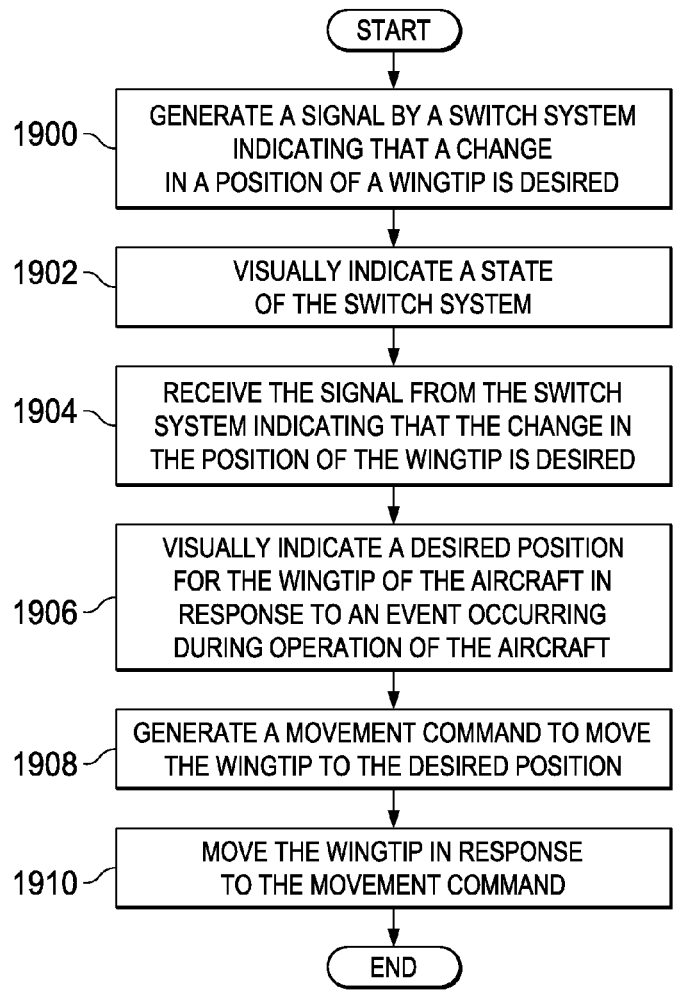
FIG. 19 is an illustration of a flowchart of a process for controlling a wingtip in accordance with an illustrative embodiment.

With reference now to FIG. 19, an illustration of a flowchart of a process for controlling a wingtip is depicted in accordance with an illustrative embodiment. The process illustrated in FIG. 19 may be implemented in airfoil structure control environment 200 in FIG. 2. One or more of the different operations may be implemented using one or more components in wingtip control system 204 for aircraft 202 in FIG. 2.

The process begins by generating a signal by a switch system indicating that a change in a position of a wingtip is desired (operation 1900). In this depicted example, signal 238 may be generated by switch system 300 in response to placing flight deck interface 208 into armed state 236. In particular, armed signal 240 may be generated by first switch 303 in switch system 300. Armed signal 240 indicates that a change in position 218 of wingtip 224 is desired.

The process then visually indicates a state of the switch system (operation 1902). For instance, first visual indication 308 may indicate that switch system 300 has been placed in armed state 326.

Thereafter, the process receives the signal from the switch system indicating that the change in the position of the wingtip is desired (operation 1904). In this illustrative example, controller 212 receives signal 238 from flight deck interface 208 indicating desired position 219 of wingtip 224 is desired.

The process then visually indicates a desired position for the wingtip of the aircraft in response to an event occurring during operation of the aircraft (operation 1906). In this depicted example, controller 212 changes position 218 of second switch 304 in switch system 300 in response to signal 238 and event 242 occurring during operation of aircraft 202.

Next, the process generates a movement command to move the wingtip to the desired position (operation 1908). The process then moves the wingtip in response to the movement command (operation 1910), with the process terminating thereafter.

Figure 20:
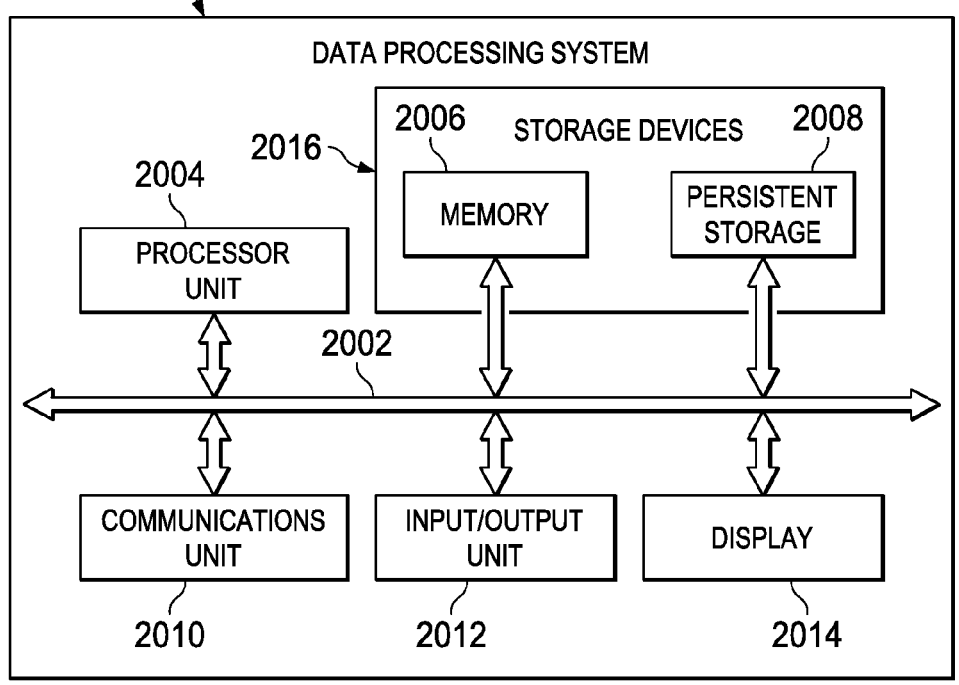
FIG. 20 is an illustration of a block diagram of a data processing system in accordance with an illustrative embodiment.
Figure 20:
Figure 20:
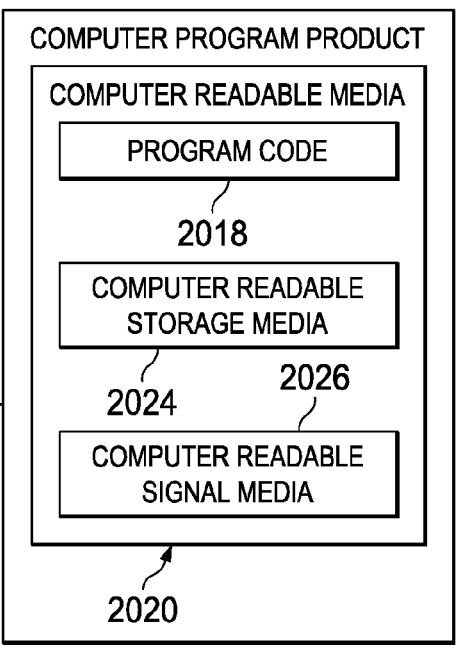

Turning now to FIG. 20, an illustration of a block diagram of a data processing system is depicted in accordance with an illustrative embodiment. Data processing system 2000 may be used to implement one or more computers in computer system 215 in FIG. 2. As depicted, data processing system 2000 includes communications framework 2002, which provides communications between processor unit 2004, storage devices 2006, communications unit 2008, input/output unit 2010, and display 2012. In some cases, communications framework 2002 may be implemented as a bus system.

Processor unit 2004 is configured to execute instructions for software to perform a number of operations. Processor unit 2004 may comprise a number of processors, a multi-processor core, and/or some other type of processor, depending on the implementation. In some cases, processor unit 2004 may take the form of a hardware unit, such as a circuit system, an application specific integrated circuit (ASIC), a programmable logic device, or some other suitable type of hardware unit.

Instructions for the operating system, applications, and/or programs run by processor unit 2004 may be located in storage devices 2006. Storage devices 2006 may be in communication with processor unit 2004 through communications framework 2002. As used herein, a storage device, also referred to as a computer readable storage device, is any piece of hardware capable of storing information on a temporary and/or permanent basis. This information may include, but is not limited to, data, program code, and/or other information.

Memory 2014 and persistent storage 2016 are examples of storage devices 2006. Memory 2014 may take the form of, for example, a random access memory or some type of volatile or non-volatile storage device. Persistent storage 2016 may comprise any number of components or devices. For example, persistent storage 2016 may comprise a hard drive, a flash memory, a rewritable optical disk, a rewritable magnetic tape, or some combination of the above. The media used by persistent storage 2016 may or may not be removeable.

Communications unit 2008 allows data processing system 2000 to communicate with other data processing systems and/or devices. Communications unit 2008 may provide communications using physical and/or wireless communications links.

Input/output unit 2010 allows input to be received from and output to be sent to other devices connected to data processing system 2000. For example, input/output unit 2010 may allow user input to be received through a keyboard, a mouse, and/or some other type of input device. As another example, input/output unit 2010 may allow output to be sent to a printer connected to data processing system 2000.

Display 2012 is configured to display information to a user. Display 2012 may comprise, for example, without limitation, a monitor, a touch screen, a laser display, a holographic display, a virtual display device, and/or some other type of display device.

In this illustrative example, the processes of the different illustrative embodiments may be performed by processor unit 2004 using computer-implemented instructions. These instructions may be referred to as program code, computer usable program code, or computer readable program code and may be read and executed by one or more processors in processor unit 2004.

In these examples, program code 2018 is located in a functional form on computer readable media 2020, which is selectively removeable, and may be loaded onto or transferred to data processing system 2000 for execution by processor unit 2004. Program code 2018 and computer readable media 2020 together form computer program product 2022. In this illustrative example, computer readable media 2020 may be computer readable storage media 2024 or computer readable signal media 2026.

Computer readable storage media 2024 is a physical or tangible storage device used to store program code 2018 rather than a medium that propagates or transmits program code 2018. Computer readable storage media 2024 may be, for example, without limitation, an optical or magnetic disk or a persistent storage device that is connected to data processing system 2000.

Alternatively, program code 2018 may be transferred to data processing system 2000 using computer readable signal media 2026. Computer readable signal media 2026 may be, for example, a propagated data signal containing program code 2018. This data signal may be an electromagnetic signal, an optical signal, and/or some other type of signal that can be transmitted over physical and/or wireless communications links.

The illustration of data processing system 2000 in FIG. 20 is not meant to provide architectural limitations to the manner in which the illustrative embodiments may be implemented. The different illustrative embodiments may be implemented in a data processing system that includes components in addition to or in place of those illustrated for data processing system 2000. Further, components shown in FIG. 20 may be varied from the illustrative examples shown.

Figure 21:
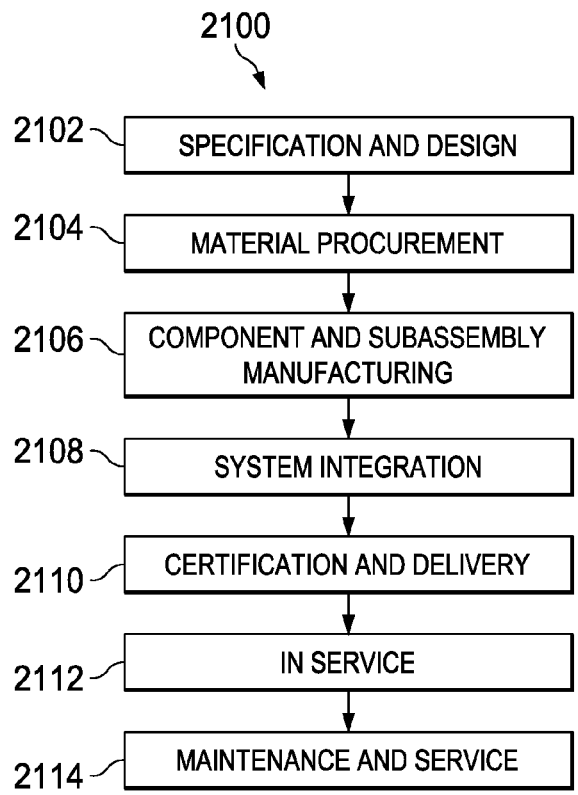
FIG. 21 is an illustration of a block diagram of an aircraft manufacturing and service method in accordance with an illustrative embodiment.
Figure 22:
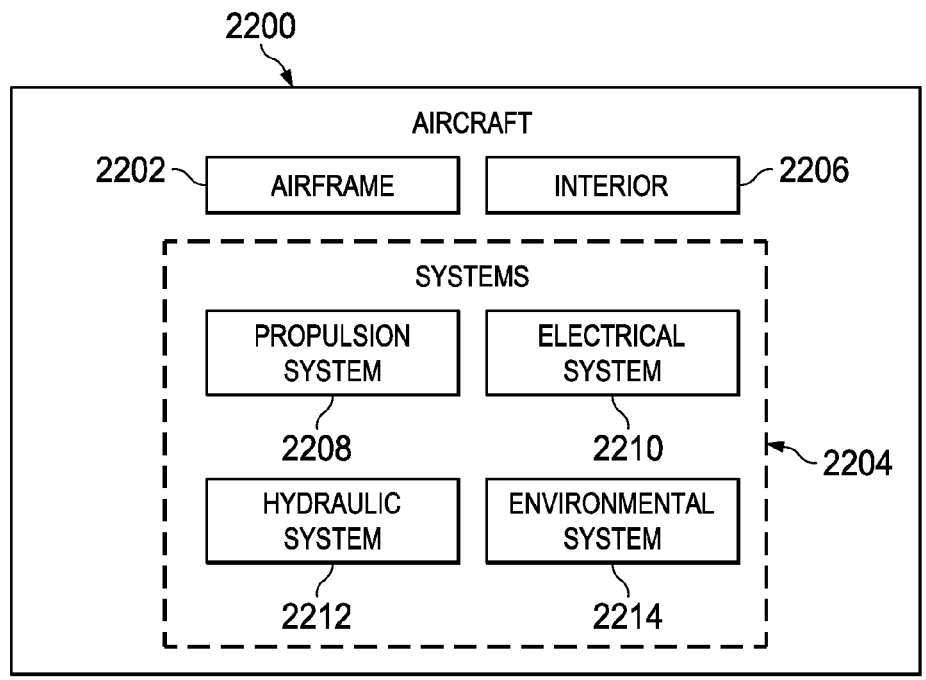
FIG. 22 is an illustration of a block diagram of an aircraft in which an illustrative embodiment may be implemented.

Illustrative embodiments of the disclosure may be described in the context of aircraft manufacturing and service method 2100 as shown in FIG. 21 and aircraft 2200 as shown in FIG. 22. Turning first to FIG. 21, an illustration of a block diagram of an aircraft manufacturing and service method is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 may go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of a block diagram of an aircraft is depicted in which an illustrative embodiment may be implemented. In this example, aircraft 2200 is produced by aircraft manufacturing and service method 2100 in FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2100 in FIG. 21. In one illustrative example, components or subassemblies produced in component and subassembly manufacturing 2106 in FIG. 21 may be fabricated or manufactured in a manner similar to components or subassemblies produced while aircraft 2200 is in service 2112 in FIG. 21. As yet another example, one or more apparatus embodiments, method embodiments, or a combination thereof may be utilized during production stages, such as component and subassembly manufacturing 2106 and system integration 2108 in FIG. 21. One or more apparatus embodiments, method embodiments, or a combination thereof may be utilized while aircraft 2200 is in service 2112 and/or during maintenance and service 2114 in FIG. 21. The use of a number of the different illustrative embodiments may substantially expedite the assembly of and/or reduce the cost of aircraft 2200.

In particular, wingtip control system 204 from FIG. 2 may be installed during any one of the stages of aircraft manufacturing and service method 2100. For example, without limitation, wingtip control system 204 from FIG. 2 may be used to control wingtip 224 during in service 2112. Wingtip control system 204 may be installed or refurbished during at least one of component and subassembly manufacturing 2106, system integration 2108, routine maintenance and service 2114, or some other stage of aircraft manufacturing and service method 2100.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments provide a method and apparatus for controlling wingtip 224 in FIG. 2. In particular, the illustrative embodiments provide a method and apparatus for controlling wingtip 224 in FIG. 2.

Wingtip control system 204 comprises switch system 300 for flight deck 214 of aircraft 202 and controller 212. Switch system 300 is configured to be placed into armed state 236 and generate armed signal 240. Controller 212 is in communication with switch system 300. Controller 212 is configured to receive armed signal 240 from switch system 300, visually indicate desired position 219 for wingtip 224 of aircraft 202 in switch system 300 in response to event 242 occurring during operation of aircraft 202, and generate movement command 232 to move wingtip 224.

With the use of an illustrative embodiment, second switch 304 may be moved automatically once armed signal 240 is sent to controller 212 and event 242 occurs, resulting in movement of wingtip 224. In this manner, no additional instructions or commands from flight crew 210 are needed to operate wingtip 224. If flight crew 210 does desire to change the status of flight deck interface 208, flight crew 210 may manually override automatic movement of wingtip 224 by moving second switch 304 back to its original position.

The illustrative embodiments also provide an intuitive flight deck interface 208 for operation of wingtip 224 by flight crew 210. The configuration of flight deck interface 208 does not reduce the view of flight crew 210.

Moreover, the illustrative embodiments provide an integrated control system, display, and checklist that visually indicate changes in desired position 219 for wingtip 224. Alert 316 also may be generated in situations where flight crew 210 does not properly arm flight deck interface 208, wingtip 224 does not move as desired, or some other event occurs. As a result, operation of wingtip 224 is less time-consuming with the use of an illustrative embodiment than with some previously used control systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A wingtip control system comprising:
   a switch system for a flight deck of an aircraft, such that the switch system comprises a visual indication of a desired position for a wingtip of the aircraft, and an interface configured to be placed into an armed state and generate an armed signal; and
   a controller in communication with the switch system, wherein the controller is configured to:
   receive the armed signal from the switch system;
   receive an indication of an occurrence of an event for the aircraft;
   present, in the switch system, the visual indication based upon reception of the armed signal and the indication of the occurrence of the event; and generate, based upon a presentation of the visual indication in the switch system, a movement command to move the wingtip.

2. The wingtip control system of claim 1, wherein the switch system is configured to be placed into the armed state prior to at least one of: a takeoff, and a landing of the aircraft.

3. The wingtip control system of claim 1, wherein the switch system comprises a first switch and a second switch, wherein the first switch is configured to be placed into the armed state and the second switch is configured to visually indicate the desired position for the wingtip of the aircraft in response to the event.

4. The wingtip control system of claim 3 further comprising:
a first visual indication associated with the first switch and configured to indicate the armed state of the first switch; and
a second visual indication associated with the second switch and configured to indicate the desired position of the wingtip of the aircraft to be sent to the controller.

5. The wingtip control system of claim 3, wherein the second switch is further configured to be moved manually by a flight crew between a first position and a second position to perform an operation selected from at least one of: command movement of the wingtip, and disable the armed state of the first switch.

6. The wingtip control system of claim 3, wherein the controller is configured to move the second switch to visually indicate the desired position for the wingtip of the aircraft in response to the event and further configured to generate the movement command to move the wingtip responsive to movement of the second switch.

7. The wingtip control system of claim 3, wherein the switch system comprises a switch selected from one of: a lever, a rotary knob, a button, a slider, a physical switch, and a graphical switch displayed on a display device.

8. The wingtip control system of claim 1, wherein the controller is further configured to move the wingtip of the aircraft using a wingtip movement system in response to the movement command.

9. The wingtip control system of claim 1, wherein the event is selected from at least one of a position of the aircraft, a phase of flight of the aircraft, a speed of the aircraft, or a position of a control surface in the aircraft.

10. The wingtip control system of claim 1, wherein the controller is further configured to move the wingtip between a folded position and an unfolded position.

11. An apparatus comprising:
a flight deck interface for an aircraft such that the flight deck interface comprises a visual indication of a desired position for a wingtip of the aircraft, the flight deck interface being configured to be placed into an armed state; and
a controller, in communication with the flight deck interface, configured to:
receive a signal that indicates a desire for a change in a position of an airfoil structure;
receive an indication of an occurrence of an event for the aircraft;
present, on the flight deck interface, based upon reception of the signal and the indication of the occurrence of the event, the visual indication;
generate, based upon the visual indication, a movement command; and
send the movement command to an airfoil structure movement system to move the airfoil structure between a deployed position and an undeployed position.

12. The apparatus of claim 11, wherein the flight deck interface comprises a switch system configured to be placed into the armed state and generate the signal, and wherein the switch system comprises a first switch and a second switch, the first switch configured to generate the signal and the second switch configured to move between a first position and a second position in response to the event.

13. The apparatus of claim 12, wherein the event is selected from at least one of a position of the aircraft, a phase of flight of the aircraft, a speed of the aircraft, or a position of a control surface of the aircraft.

14. A method for controlling a wingtip of an aircraft, the method comprising:
receiving in a wingtip controller, from a flight deck interface, a signal indicating a desire for a change in a position of the wingtip;
receiving in the wingtip controller an indication of an occurrence of an event for the aircraft;
presenting a visual indication, in the flight deck interface, based upon reception of the signal and the indication of the occurrence of the event, of the desire; and
generating, based upon the visual indication in the flight deck interface, a movement command for moving the wingtip to a position corresponding to the visual indication.

15. The method of claim 14, wherein the flight deck interface includes a switch system, the method further comprising:
generating the signal indicating that the change in the position of the wingtip is desired by the switch system.

16. The method of claim 15 further comprising:
visually indicating a state of the switch system.

17. The method of claim 15, wherein the switch system comprises a first switch and a second switch, the first switch being configured to generate the signal and the second switch being configured to move between a first position and a second position.

18. The method of claim 14 further comprising:
moving the wingtip in response to the movement command.

19. The method of claim 18, wherein changing the position of the wingtip comprises:
moving the wingtip between a deployed position and an undeployed position using a wingtip movement system.

20. The method of claim 14, wherein the event is selected from at least one of a position of the aircraft, a phase of flight of the aircraft, a speed of the aircraft, or a position of a control surface in the aircraft.

* * * * *